(12) United States Patent
Denton et al.

(10) Patent No.: US 10,668,405 B2
(45) Date of Patent: Jun. 2, 2020

(54) MULTI-VESSEL FILTRATION SYSTEM FOR HAZARDOUS OR RADIOACTIVE WASTE WATER

(71) Applicant: MTN Group, LLC, Sweetwater, TN (US)

(72) Inventors: Mark S. Denton, Sweetwater, TN (US); Jeffrey T. Prince, Sweetwater, TN (US)

(73) Assignee: MTN Group, LLC, Sweetwater, TN (US)

( * ) Notice: Subject to any disclaimer, the term of this patent is extended or adjusted under 35 U.S.C. 154(b) by 109 days.

(21) Appl. No.: 16/134,319

(22) Filed: Sep. 18, 2018

(65) Prior Publication Data

US 2019/0015762 A1 Jan. 17, 2019

Related U.S. Application Data

(63) Continuation-in-part of application No. 14/932,364, filed on Nov. 4, 2015, now Pat. No. 10,106,439.

(60) Provisional application No. 62/208,274, filed on Aug. 21, 2015.

(51) Int. Cl.

| | |
|---|---|
| *B01D 15/22* | (2006.01) |
| *C02F 1/42* | (2006.01) |
| *G21F 9/12* | (2006.01) |
| *B01D 15/36* | (2006.01) |
| *B01D 15/18* | (2006.01) |
| *B01D 15/14* | (2006.01) |
| *C02F 101/00* | (2006.01) |
| *C02F 103/34* | (2006.01) |
| *C02F 103/10* | (2006.01) |
| *C02F 103/06* | (2006.01) |

(52) U.S. Cl.
CPC ............. *B01D 15/22* (2013.01); *B01D 15/14* (2013.01); *B01D 15/1871* (2013.01); *B01D 15/361* (2013.01); *C02F 1/42* (2013.01); *G21F 9/12* (2013.01); *C02F 2101/006* (2013.01); *C02F 2103/06* (2013.01); *C02F 2103/10* (2013.01); *C02F 2103/34* (2013.01); *C02F 2301/08* (2013.01); *C02F 2303/18* (2013.01)

(58) Field of Classification Search
None
See application file for complete search history.

(56) References Cited

PUBLICATIONS

Campbell et al., Evaluation of the Submerged Demineralizer System Flowsheet for Decontamination of High-Activity-Level Water, Oak Ridge National Laboratory ORNL-TM7446.

*Primary Examiner* — Richard C Gurtowski
(74) *Attorney, Agent, or Firm* — Pitts & Lake, P.C.

(57) ABSTRACT

Surface or submersible sluiceable systems are disclosed for use in removing hazardous contaminants or radioactive isotopes from a fluid stream, such as a fluid stream from the primary coolant loop or secondary loop of a nuclear reactor system, or a fluid stream from a spent-fuel pool or pond or hazardous or radioactive contaminants in ground water. Generally, this surface or submersible sluiceable system is adapted to be utilized in a surface skid or submersed in the fluid stream, and additionally the vessels are adapted to be sluiced and reused after use, resulting in a potentially stabilized, non-leaching final waste product with a substantially reduced volume for storage or disposal. The system can be utilized with standard ion exchange beads or preferably with inorganic granular media.

24 Claims, 20 Drawing Sheets

MULTI-VESSEL FILTRATION SYSTEM FOR HAZARDOUS OR RADIOACTIVE WASTE WATER

REFERENCE TO RELATED APPLICATIONS

This Application is a continuation-in-part of U.S. Non-provisional application Ser. No. 14/932,364, filed Nov. 4, 2015, entitled "Surface or Submersible Sluiceable Filtration System for Hazardous or Radioactive Waste Water," which claimed the benefit U.S. Provisional Patent Application No. 62/208,274, filed Aug. 21, 2015, both of which are incorporated by reference in the entirety, except that in the event of any inconsistent disclosure or definition from the present application, the disclosure or definition herein shall prevail.

BACKGROUND

1. Field of Invention

The present invention relates generally to the treatment of hazardous and radioactive waste and in particular to processing waste water from nuclear power reactors and other sources of radioactive waste materials as well as mining waste water and groundwater.

2. Description of the Related Art

It is essential to isolate, contain and stabilize hazardous and radioactive contaminants. The source of these contaminants or isotopes can be normal operation of nuclear power plants in the primary (power generation) or secondary (waste circuit) loops. It can also be from leaks in such systems. Alternatively, hazardous wastes or isotopes can be generated in processing facilities. Lastly, hazardous wastes as well as radioactive wastes can be naturally occurring and can enter or leak into the surface or ground waters.

Such hazardous contaminants could include not only man-made chemicals that have leaked or leached into surface waters or ground waters, accelerated into water systems through mining, agriculture, construction, etc.; but could be naturally occurring in the earth and have leached into such waters over time. These could include EPA RCRA heavy metals or other components considered hazardous to humans, wild life or drinking water. Likewise, radioactive isotopes can leak into surface or ground waters from nuclear plants, fuel processing plants, research facilities, defense plants (e.g., DOE facilities) natural disasters such as Three Mile Island (TMI) and Fukushima, from in-situ leaching/hydrometallurgy or other mining operations; and even from natural contamination within the earth.

It would also be advantageous for the isotope or hazardous waste separation and isolation technology to also facilitate and work with technologies for the processing of those specific radioactive isotopes or contaminants for long-term, safe storage or disposal, as for example through solidification, vitrification or, simply approved dry containment and storage.

One system as described in U.S. Pat. No. 9,714,457 discloses submersible media filters and submersible columns for use in removing radioactive isotopes and other contaminants from a fluid stream, such as a fluid stream from the primary coolant loop of a nuclear reactor system or a fluid stream from a spent-fuel pool. Generally, these submersible media filters and submersible columns are adapted to be submersed in the fluid stream, and additionally the filters are adapted to be vitrified after use, resulting in a stabilized, non-leaching final waste product with a substantially reduced volume compared to the original filter. This patent involves submersible media filters and submersible column that were designed to fit into the housing of a commercially available Tri Nuclear Corporation underwater vacuum (or suction) pumping system. These canisters can contain granular media, they are clearly disposable versus re-useable and are not sluiceable. The amount of usable media is limited to the size of a canister that will fit into the existing commercially available Tri Nuclear housings.

Tri Nuclear Corporation also markets an underwater demineralization system utilizing their standard vacuum/suction pumping system. While this system can be of various sizes (standard is 30 inches in diameter with the smallest available being 18 inches in diameter) and hold differing amounts of media, it is a suction type system and not a positive pressure one limiting its usefulness or ability to couple multiple units together, use with fluids containing suspended solids or use with difficult media to flow through (e.g., granular media). Such a suction system is also prone to plugging due to the low motive force of suction vs pressure pumping. The system is also limited in use to standard ion exchange resins (beads) and is not capable of use with granular inorganic media due to the sluicing design. The sluice system is strictly limited since it depends on a separate air actuated pump located on the surface out of the fluid stream; thus, exposing workers and the environment to contaminated media and liquid. The external and remote sluice pumping system makes it unacceptable for use with difficult to fluidize and move media such as commonly used granular media. This system is also limited to underwater or submerged applications. The suction pump is located within the vessel itself making an independent pump change out impossible. In the processing mode, this system is only capable of down flow processing through the media and uses a conventional screened internal lateral system at the bottom of the vessel which causes a dead space (unused media) at the bottom of the vessel. This can also leave some spent media in the vessel upon sluicing.

In 1980, Campbell, Collins, King, and Knauer, of Oak Ridge National Laboratory, disclosed a submerged demineralizer system (SDS) for decontamination of high-activity-level water, supporting the decontamination of the Three Mile Island, TMI, Nuclear Power Station incident. Contaminated water was clarified by filtration and transferred into ion exchange feed tanks. The clarified water was pumped through either or both of two duplicate trains of ion exchange columns, each train consisting of a series of three columns containing zeolite (Linde Ionsiv IE-95, formerly called AW-500, in the Na+ form). The effluent from either train of zeolite columns was then passed through either of two duplicate columns containing an organic cation exchange resin (NalciteHCR-S, initially in the H+ form). Finally, the effluent water from both cation resin columns was combined and passed through a single large polishing column containing layers of cation resin (HCR-S, initially in the H+ form), anion resin (Nalcite SBR, initially in the OH− form), and mixed resin (Nalcite MR-3, a 1:1 volume mixture of HCR-S and SBR). When the zeolite within any particular column was expended, the column was simply hoisted out of the pool and disposed of, while a new one was lowered into the correct position. All vessels where physically moved around under water to get to the correct positions. Neither granular/inorganic or bead/organic media/resins were either sluiced into or out of the vessels—thus increasing dose to workers and the environment, as well as eliminating the opportunity of reusing the expensive vessels.

There are several objectives to processing wastewater. The primary objective is to isolate the hazardous component(s), be it a radioactive or chemical hazard, and do so in as small and stable a package as possible. Secondly, the waste water needs to be substantially free of contaminants to be safe for environmental release or for exposure to workers (dose in radiation terminology). Lastly, the volume of waste must be minimized due to the high cost of either, or both, treatment or storage and, particularly, disposal of such waste in a safe and secure disposal site.

The main cost of water processing systems is normally the pressure, or processing, vessel and ancillary external and internal piping, external piping or hoses and pump(s). Secondarily is the cost of media inserted into the vessel to accomplish the removal of contaminants themselves. Herein is described a system designed to reuse the expensive portion of the system and only dispose of the less expensive and contaminated media. The latter is also easier to treat by stabilization, solidification or thermal methods this way as it is separated now from the treatment system, which can now be reused and for an indefinite number of cycles.

The key to making this reuse possible is the development of an effective sluicing system allowing the media to be sluiced into the vessel at the outset of treatment or when the spent media is sluiced out and new media is needed to be sluiced back in to continue treatment. Normally, sluicing media into a system doesn't present a problem. However, sluicing media that can agglomerate, such as granular inorganic based media, back out after processing, loading, suspended solids filtration, packing of the media, media agglomeration, etc., is extremely challenging. While sluiceable systems have been used in the past, they have limited capabilities as to what types of material they can handle. Sluicing standard (organic) ion exchange resins (beads) can readily be accomplished by a number of methods as it is unlikely to pack and is fairly easy to fluidize for movement. However, sluicing spent media that can agglomerate, such as granular inorganic based media, out of the vessel after use has not been previously accomplished in an efficient manner.

As can be seen from the above description, there is an ongoing need for simple and efficient materials and methods for decontaminating radioactive and similarly contaminated waste waters that permit the use of media other than ion exchange resins and that increase the efficiency and speed of the decontamination process. The devices and methods of the present invention overcome at least one of the disadvantages associated with conventional devices and methods.

SUMMARY

Disclosed herein is a surface or submersible and sluiceable system for use in either hazardous waste waters (e.g., hydrometallurgical mining, uranium recovery, mine run off, ground waters, etc.) or radioactive waste waters (e.g., fuel pools, ponds, vaults, primary or secondary loop, leakage into standing water or ground water, etc.). This system is capable of being operated either on the surface (skid mounted on land) or under water in the submersible mode. This being necessary due to the wide range of applications utilizing a variety of media today. Such media include not only standard ion exchange resin or beads, but also inorganic granular media commonly in usage in the mining, groundwater, industrial, municipal and nuclear markets. Such a system must be capable of not only processing with either type of media, but, most importantly, being capable of sluicing either type both into and out of the pressure treatment vessel. The sluicing of granular media presents the primary challenge which has been overcome by the development of a novel eductor system, again, capable of operating on the surface (air) or submersed (under water). This eductor system consists of a field effect eductor located within the vessel at the very bottom of the packed media bed. This allows for complete removal of all the spent and contaminated media avoiding high remaining dose as well as fully utilizing the entire vessel when new fresh media is sluiced in. Most systems in the past attempting such evacuation have a dead space of media remaining in the bottom of the vessel below the internal laterals that is not possible to either back wash (float) or evacuate (sluice) at the end of a processing cycle. It is the purpose of the internal field effect eductor to first begin the fluidization of said media by the suction caused upward by the higher velocity sluice water introduced in the downward direction which then turns upward at the suction head. Since it resides just above the lower media containment screen, it is capable of removing the entire bed of media as the upper media collapses toward the suction port of the sluice eductor. This further avoids the necessity of a movable sluice tube which would have to be lowered into the vessel penetrating the media bed as it moved downward. It also replaces the standard sluice tube extending from top to bottom which only has a suction mode from above the system making them an inefficient method of sluicing out difficult to mobilize media. Grinder pumps, or any impeller type pump, can be very efficient in moving solids; but, of course, this causes fracturing of the media and undesired fines introduction into the system.

Further disclosed herein is an optional secondary motive force eductor pump (Venturi type) located at the top of the pressure vessel at the sluice out port which, once the field effect eductor begins the media movement, the motive force eductor keeps the media fluidized and moving. The latter precludes the age-old problem of difficult media lodging in the sluice tube or exit pipe or hose. As mentioned, this occurs due to a slip stream effect where the water surpasses the media and the latter slows down or becomes less fluidized resulting in plugging of lines referred to as sanding.

In some embodiments of the present inventive concept, the removable fill head or flanged top of the vessel has a number of ports for various operations. Normally this will consist of six (6) ports, but could have additional options as they arise. The vessel can begin operation already filled with media or the media, as when it is in the reuse mode and the media has been sluiced out, the media can be sluiced in until a certain level below the fill head through the sluice in port. This sluice in port extends just below the top media containment screen and the media floats to the bottom from there. Once full, in either case, the process water (contaminated) enters through the inlet port, through the top containment screen downward through the entire vessel and through the bottom containment screen just above the bottom of the vessel. Thus, the waste water is uniformly fed in the up-flow configuration through the bottom screen, thus, fully utilizing the entire vessel and bed of media. Typical wire-wrap or wedge-wire lower internals are normally located well above the floor of the vessel within the media bed. The inlet port can be piped or hosed (normally with quick connect sealable fittings) from a feed tank or from the fuel pool or other underwater source itself. The outlet or processed effluent water port is located at the top of the vessel above the top media containment screen. This exit port is then piped or hosed to the processed water effluent tank or back into the pool itself in recycle mode; thus, achieving a decontamination factor over time versus a once through system. When the media is expended or spent, in order to reuse the vessel system and ancillary equipment, sluice water is introduced through the top sluice water port into the primary field effect eductor tube at the top. This is a high velocity flow down the sides of the eductor tube which turns upward at the bottom of the eductor forming a vacuum or suction at the bottom media inlet at the bottom of the tube which is located just above the bottom media containment screen. The media is thereby fluidized and, by suction, is mobilized up the sluice out (eductor) tube to above the fill head where it is piped or hosed with quick connect style fittings to a spent media holding vessel. This waste containment can be any type of dewaterable container from a simple vessel, to a High Integrity Container (HIC) or, for fully underwater operations, a screened box fitted within a submersed containment box, sometime referred to as a pond skip. These are simple, open top boxes utilized for holding contaminated hardware on the pool floor. Such a screened box (likened to a crab or lobster pot) within the metal box would have a removable top for ease of further treating the spent media by solidification, stabilization, thermal processing, etc. Further, the top of the screened box would have a media sluice in port to introduce the media into the containment box. The sluice water would exit the screened box out the thousands of small perforated and screened openings back into the pool itself while, as in the vessel, containing the media. Once the strainer box within a box is full of media, it can be stored underwater for shielding purposes; or, if being taken to further treatment or disposal, can simply be lifted and drained into the box or pool. Further, to accelerate drying of the media, air or warm air can be introduced into the sluice media port at the top of the screened box.

In some embodiments of the present general inventive concept, there are two media containment screens within the vessel which contain the media bed itself. Both are made of a perforated metal screen for support and are backed by a finer mesh screen which actually contains the media. As most ion exchange and granular media range from 15-20 mesh by 50-60 mesh, this screen must be smaller than the smallest particles and is normally 80 mesh. The top containment screen assembly is supported on top and bottom of the screen by clamps thus securing the screen to the three top ports (waste water inlet, sluice in and sluice out). This top screen has three very close tolerance openings through it, thus allowing these three tubes to penetrate but not allowing media above that portion of the vessel. The bottom media containment screen is supported near the bottom of the vessel by a lip around the vessel which is designed not only to not allow media into the small bottom void of the vessel, but also to avoid spent media build up in crevices known as crud traps or hot spots. Unlike the top screen, the bottom containment screen has only one tube protruding through it in the middle which is the waste water feed tube feeding the vessel from the bottom up through the screen for optimum dispersion and plug flow. While it is common also to have down flow of the feed, with pick up at the bottom; up flow has the advantage of purging the vessel completely of any air pockets formed during start up or operation, as well as eliminating the possibility of uneven flow through the bed (or non-plug flow). Like the top screen, the bottom screen is also supported by clamps above and below the screen attached around the feed tube. The sluice tube with field effect eductor stops just short of the bottom screen for optimum purging of the spent media.

In some embodiments of the present general inventive concept, all connections from the surface or under water are made by removable hoses (or pipes) using standard quick disconnects providing for instant cut off at the vessel itself as well as the hoses. This precludes any leakage upon removal as well as any escape of media either into the environment or to a pool. Such removal of hoses could be needed in the event of replacement or repair and still allows the vessel system to be reusable. In the event, for any reason, that the entire internal vessel assembly needed repair or replacement, the fill head can be unbolted from the vessel and the entire internal vessel assembly lifted in one piece out of the vessel. This, again, can be done above ground or underwater. To facilitate the lowering of the vessel into a surface or underwater (bottom of pool) location, as well as for removal of the vessel internals, the fill head is equipped with one or more lifting lugs.

In some embodiments of the present general inventive concept, a vent port penetrates the fill head where captive air, but not fluid, can be displaced from the vessel. This is utilized in initial operation and air purging of the system to prevent air pockets and effect pumping of waste water; but also prevents buoyancy that might be caused by any introduction of air into the vessel by the pressure pump while the vessel is submerged. This prevents any floatation of the vessel within the pool. Lastly, in the event of any gas and pressure generation caused by high level radiation of organic media, dissipation through this vent port eliminates this potential hazard.

In some embodiments of the present general inventive concept, a detection device (e.g., a gamma monitor in the case of nuclear applications) can be placed on the vessel itself and/or on/in the discharge port to measure during operation how contaminated the media itself is getting, or if there is breakthrough of contamination in the effluent (indicating the media is spent), respectively. This can keep the media from becoming too hot (too high a dose for handling later) or from having an unacceptable level of contamination in the treated water. It also alerts the operator that it is time to change out the media or advance the sequence of the vessels in applications utilizing multiple, or lead-lag, vessels.

In some embodiments of the present general inventive concept, multiple vessels can be put in series, one pumping its effluent to the next, in what is known commonly as a lead-lag system. This is made possible by the use of an adequate pressure pump (and potentially booster pump[s]) and would not be possible with a suction type pumping system. In this way, one can achieve much higher decontamination factors, meaning a cleaner system effluent product. Additionally, if desired, in a lead-lag system, the order of the treatment vessels can be moved up in the series allowing the fullest use of the media in the latter vessels, which will be only partially spent compared to the lead vessels. In other words, say if one had four vessels, the first vessel can be sluiced out, re-filled, and becomes the last vessel, number four becomes three, three becomes two and two becomes the lead vessel, or number one. In a surface system, this can be easily achieved by physically moving the vessels, by shifting hoses, or by a valving sequence. In an underwater system, this is, of course, a more challenging sequencing operation. Herein, it is proposed to have a rotating assembly (e.g., a Geneva wheel) above the vessel's fill heads (say in four-pack, square shaped system). In this case, the quick disconnect fittings on the fill heads would be pneumatically or physically operated to disconnect, followed by a 90 degree clockwise rotation to the next sequence by the top hose manifold assembly. Thus, advancing the vessels in the sequence without any physical movement of the underwater vessels themselves. Only the formally lead (number 1) vessel would be sluiced out and new media sluiced in, thus becoming the last (number 4), or polishing, vessel. Alternatively, the fill head assembly could be stationary with removable disconnects while the vessels themselves are rotated 90 degrees counter clockwise by a similar mechanism at the bottom.

In some embodiments, the media comprise an inorganic granular material.

In some embodiments, the media includes standard ion exchange resin.

In some embodiments, the media can be sluiced above the water level of a pool into appropriate containment or below the water level into a specially designed cage structure within a support box or container.

In some embodiments, the spent media can be dried for further treatment or simply for dry storage in an appropriate container.

In some embodiments, the spent media can be further treated by solidification, stabilization or by thermal means.

In some embodiments, the protective mesh screen includes both perforated metal and screen mesh materials.

In some embodiments, the treatment vessel is stainless steel.

In some embodiments, the fill head ports can be attached to hoses or pipes.

In some embodiments, the hose attachments are of the quick disconnect type, camlock type, or sanitary type fitting.

In some embodiments, the spent media can be sluiced to an appropriate dewaterable container for storage or future treatment and/or disposal.

In some embodiments, the spent media can be sluiced to an underwater screened cage allowing the media to enter, but only the water to be discharged back into the pool.

In some embodiments, this screened cage will be of the same design as the media containment screens within the vessel except that this will be a caged independent structure or one that fits snuggly within existing under water hardware boxes found commonly in pools, thus allowing natural water shielding and ease of movement within the pool.

In some embodiments, this screened cage will have a sluice in port for media which can also be used later to feed in air or warm air to assist drying the media once the cage is removed from the pool and drained.

In some embodiments, this screened cage will have lifting lugs for ease in lifting and a removable top for ease in removing the media for further treatment and/or disposal.

In some embodiments, the system will be equipped with instruments to measure the level of contamination in the vessel bed itself or in that of the system effluent.

In some embodiments, multiple vessels can be utilized in a standard lead-lag configuration with the sequencing being controlled by an external control panel and system and the sequencing accomplished by a rotating assembly above the multiple fill heads of the vessels or at the bottom of the vessels.

Some example embodiments of the present general inventive concept generally include a surface or submersible sluiceable system for treating hazardous or radioactive waste waters arising from man-made or natural sources.

The present general inventive concept, as described herein through some example embodiments, comprises systems, processes and methods for the separation, isolation, or removal (collectively "separation") of hazardous contaminants or radioactive isotopes from substantially liquid waste materials. In many embodiments, the separation of specific hazardous or radioactive contaminants from waste waters diminishes the potential effect of said contaminants on humans, wildlife and the environment. In some embodiments, the use of such a system, especially reusable, will greatly reduce the amount of contaminated water as well as concentrated secondary waste (media).

While sluiceable systems have been used in the past, they have limited capabilities as to what types of material they can handle. Sluicing standard (organic) ion exchange resins (beads) can readily be accomplished by a number of methods as it is unlikely to pack or agglomerate and is fairly easy to fluidize for movement.

Described herein is a sluiceable system capable of not only utilizing and sluicing ion exchange resin, but also more recent advances in utilizing inorganic, granular media which are far more difficult to fluidize (unpack and float), mobilize, and, most importantly, keep fluidized and moving to the exit point without packing up (sanding) in the lines, pipes or hoses. Such sanding is caused by the sluice water slipping by the media (slip stream) faster than the media is moving, at which time the latter begins to pack up and plug (loses fluidization). The latter in the case of concentrated radioactive, or even hazardous waste causes an extreme issue to resolve and unnecessary exposure of the waste to humans and the environment.

Applications for such a system involve waste streams from a variety of sources including primary coolant loop or secondary treatment system of nuclear plants, fuel pools that must be lowered in dose, contamination leakage into trapped or ground water, mining effluents, uranium recovery processes, etc. In order to make the system more flexible, described herein is a system designed to operate either on the surface in the conventional mode or submersed under water in the fashion utilized to provide shielding by the water itself as applied to fuel pools, ponds, vaults, etc.

In order for such a system to function in either of these situations as well as with bead or more difficult granular media, a pumping system is required capable of being utilized either on the surface (in air) or submersed under water. Further, such a pumping system has to be capable of pressures and flows through such challenging media as well as being able to deliver an adequate flow of sluice water to overcome any packing or fouling that may have occurred. In order to accomplish this, a pressurized pumping system (pressure side of the pump) versus a suction pumping system (suction or vacuum side of the pump) is provided. This would allow for far more available pressure if needed due to difficult media, packing, fouling, plugging, difficult sluicing or backwash of media and even for ganging such vessel systems together say in a conventional lead-lag system where a number of vessels are used in series to better and more fully utilize the media. In an emergency situation (e.g., a power outage) where sluicing was required, say to avoid radiation heat buildup, a backup air driven pump can be utilized for this purpose. This secondary pump would be driven by an independent air tank or the tank of an air compressor. This amount of air would be adequate for the sluice out operations required until conditions were returned to normal and safe conditions.

The current invention utilizes a novel eductor system that uses a field effect eductor built into the vessel as well as a secondary and optional motive force eductor located at the sluice out port of the vessel. This unique eductor system allows the use of any type of media including inorganic granular media as well as standard ion exchange resin. This system also utilizes a unique screened media bed containment design that fully uses the entire media bed during processing as well as allows complete sluicing of the spent media upon completion of a cycle.

This current system can be operated either on the surface or submersed in the fluid stream. It can also utilize multiple vessels in series in a lead-lag operational mode due to the positive pressure pumping configuration. The vessels themselves can be of any size allowing for multiple applications of the surface or submersible operations, especially with limited space in the fluid waste stream.

In one aspect, the system includes a surface or submersible sluiceable lead-lag system to remove selected hazardous contaminants or radioactive isotopes from fluid waste materials, the system including multiple waste fluid processing vessels to hold media, said media to remove selected hazardous contaminants or radioactive isotopes from fluid waste materials when the fluid waste materials are passed through said multiple waste fluid processing vessels, said multiple waste fluid processing vessels each including a vessel body having an interior volume, a fill head having a plurality of ports giving access to the interior of said vessel body, including a fluid waste material input port, a treated fluid waste material output port, a sluice-in port to facilitate delivery of media to the interior of said vessel body, a sluice-out port to facilitate removal of spent media from the interior of said vessel body, and a sluice water input port, internal media containment screens within the vessel body, an internal waste fluid line to deliver fluid waste materials from said fluid waste material input port to a location within the interior of the vessel body, said location being placed such that fluid waste materials exiting the internal waste fluid line pass through said media before exiting the interior of the vessel body through said treated fluid waste material output port, a sluice-in tube to deliver media into the vessel during filling, and a sluice-out tube to remove media from the vessel, said sluice-out tube including a field effect eductor in fluid communication with the sluice water input port to fluidize and pump media out of the interior of said vessel body in response to sluice water entering the sluice water input port; and a rotating assembly selected from the group consisting of a rotating assembly above the fill heads of the multiple waste fluid processing vessels, and a rotating assembly at the bottom of the multiple vessels, where the fill heads include quick disconnect fittings.

In another aspect, the system includes a surface or submersible sluiceable lead-lag system to remove selected hazardous contaminants or radioactive isotopes from fluid waste materials, the system including at least two waste fluid processing vessels to hold media, said at least two waste fluid processing vessels each including a vessel body having an interior volume comprising media containment screens, and a fill head having a plurality of fill head ports providing access to the interior of the vessel body, the plurality of fill head ports including a fluid waste material input port, a treated fluid waste material output port, a media inlet port, a media outlet port, and a sluice water inlet port configured to drive a primary field effect eductor pump; a top manifold comprising a primary water inlet, a treated water outlet, a media inlet, a media outlet, a sluice water inlet, and at least one transfer tube; where the primary water inlet is in fluid communication with the fluid waste material input port, the treated fluid waste material output port is in fluid communication with the treated water outlet, the media inlet port is in fluid communication with the media inlet, the media outlet port is in fluid communication with the media outlet, and the sluice water inlet port is in fluid communication with the sluice water inlet; and a rotating assembly selected from the group consisting of a rotating assembly positioned above the at least two vessels, and a rotating assembly positioned below the at least two vessels.

In another aspect, the system includes a surface or submersible sluiceable system to remove selected hazardous contaminants or radioactive isotopes from fluid waste materials, the system including a waste fluid processing vessel to hold media, the media capable of removing selected hazardous contaminants or radioactive isotopes from fluid waste materials when the fluid waste materials are passed through said waste fluid processing vessel, said waste fluid processing vessel including a vessel body having an interior volume; a fill head forming an enclosed interior volume with the vessel body, the fill head having a plurality of ports providing fluid access to the enclosed interior volume, where the plurality of ports include a fluid waste material input port, a treated fluid waste material output port, a sluice-in port in fluid communication with a sluice-in tube, the sluice-in port configured to deliver sluice water to the enclosed interior volume by the sluice-in tube, a sluice-out port in fluid communication with a sluice-out tube, the sluice-out port configured to permit removal of spent media from the interior of said vessel body, and a sluice water input port; internal media containment screens within the vessel body; an internal waste fluid line to deliver fluid waste materials from the fluid waste material input port to a location within the interior of the vessel body, the location being placed such that fluid waste materials exiting the internal waste fluid line pass through said media before exiting the enclosed interior volume through the treated fluid waste material output port; and a primary field effect eductor within the enclosed interior volume, the primary field effect eductor configured to fluidize and pump the spent media out of the enclosed interior volume through the sluice-out port when driven by fluid entering the sluice water input port.

Other systems, methods, features and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 8 is an angled side view of the fill head assembly better showing the ports and tubes, from left to right, the sluice out, sluice water in, feed in, effluent out and sluice in.

The simplified drawings do not illustrate all the various connections and assemblies of the various components, however, those skilled in the art will understand how to implement such connections and assemblies, based on the illustrated components, figures, and descriptions provided herein, using sound engineering judgment.

DETAILED DESCRIPTION

Disclosed herein is a surface or submersible sluiceable system for use in removing hazardous ions (hereinafter "contaminants") and radioactive isotopes (hereinafter "target isotopes") from a fluid stream, such as a fluid stream from the primary coolant or secondary waste stream loop of a nuclear reactor system or a fluid stream from a spent-fuel pool, pond or vault. Generally, these systems are adapted to be surface skid-mounted systems or submersed in the fluid stream, and additionally in many embodiments the sluiceable systems are adapted to be reused with only the sluiced media being stored (above ground or under water), allowing for further treatment or for final disposal. Further treatment results in a stabilized, non-leaching final waste product with a substantially reduced volume compared to the original waste stream. Only the least expensive component, the media, is disposed of greatly saving on decontamination, storage space and extremely expensive and limited disposal space. In several embodiments, the surface or submersible sluiceable vessels can be used singly or can be ganged in series in a standard, but automated lead-lag operational mode.

Figure 1:
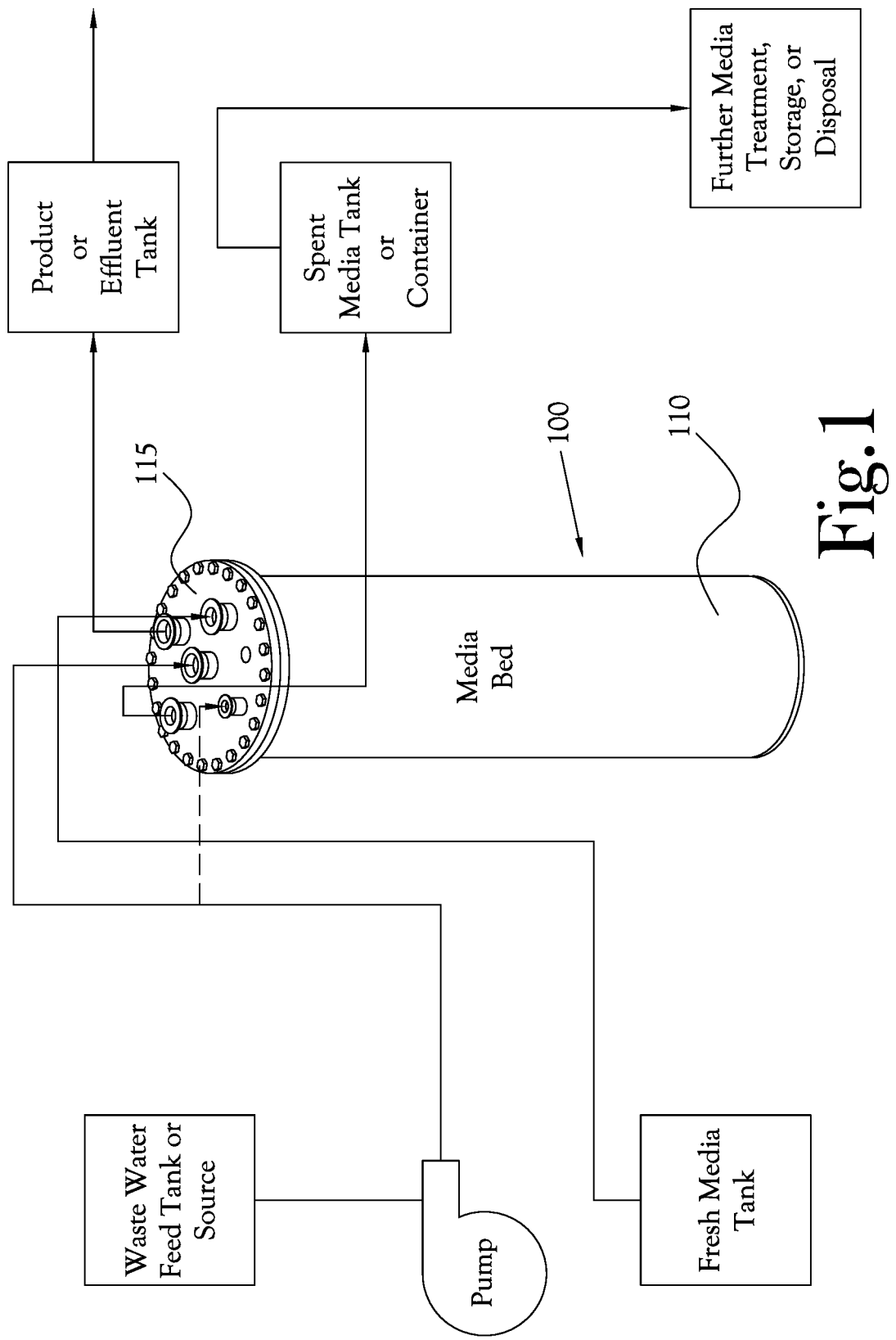
FIG. 1 is a representative process flow diagram (PFD) illustrating the set up and flow path of a surface installed sluiceable system application.
Figure 2:
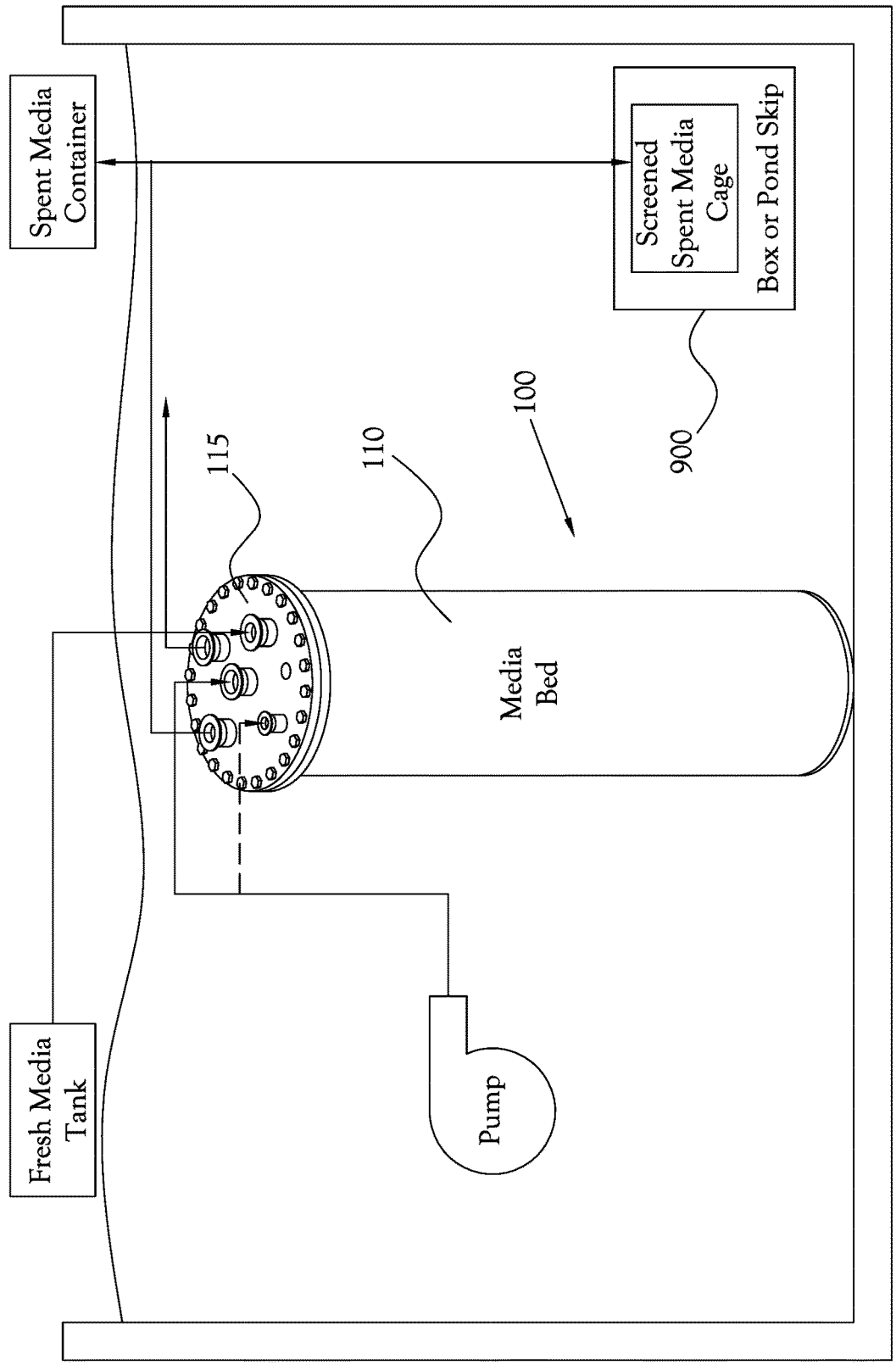
FIG. 2 is a representative process flow diagram illustrating the set up and flow path of a submersible sluiceable system application.
Figure 3:
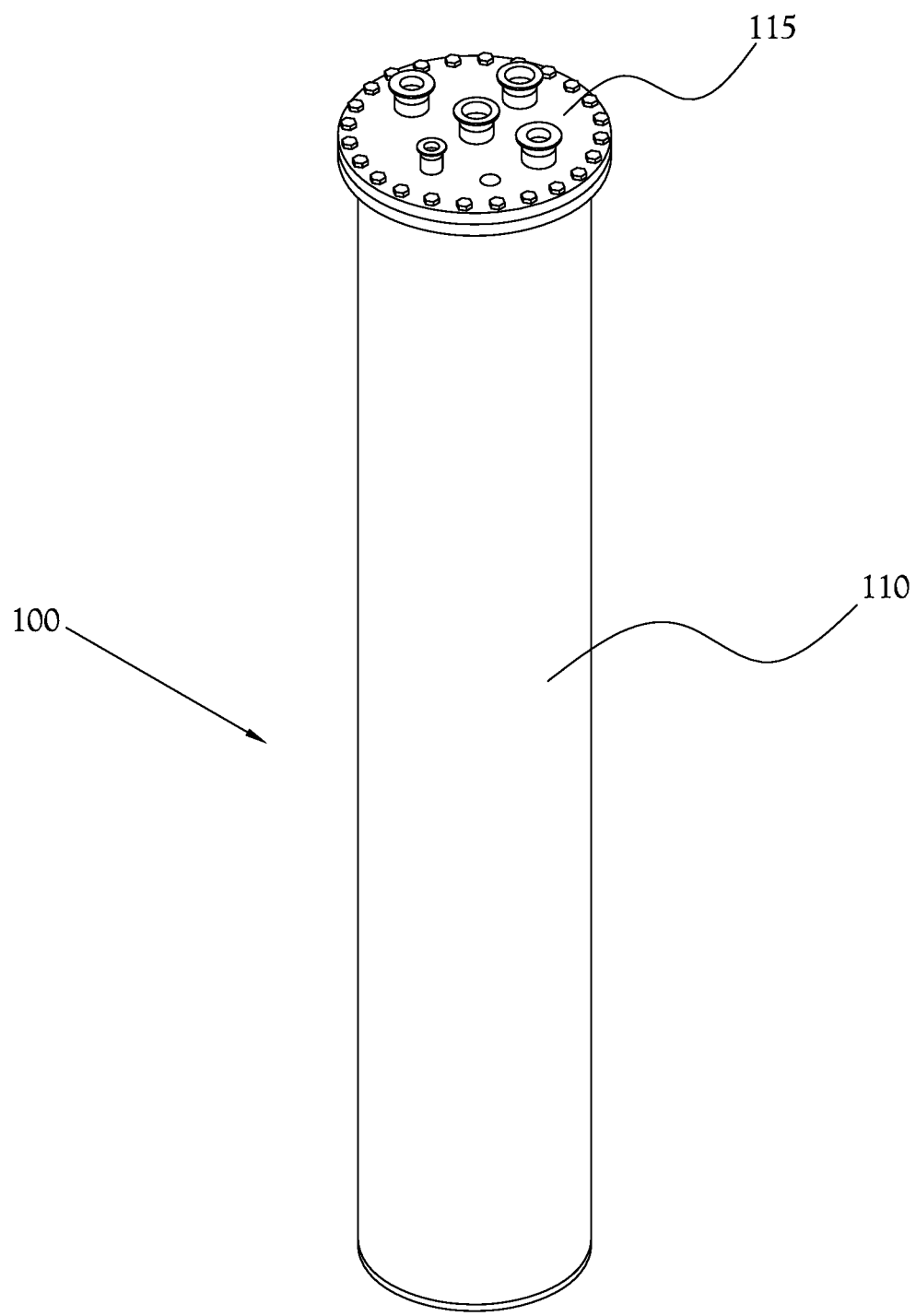
FIG. 3 is a perspective view of the exterior of one example of a surface or submersible sluiceable system vessel for separating hazardous contaminants or radioactive isotopes from water.

Turning to the Figures, FIG. 1 shows a flow diagram illustrating one example embodiment of a surface sluiceable filtration system according to the present general inventive concept. FIG. 2 shows a flow diagram illustrating the set up and flow path of a submersible sluiceable filtration system. In both FIG. 1 and FIG. 2, a media process vessel 100 includes both a tube housing 110 and a fill head 115. The illustrated example media process vessel 100 is shown generally in FIG. 3; the illustrated vessel is useful for separating hazardous contaminants or radioactive isotopes from water in a surface sluiceable system or a submersible sluiceable system.

Figure 4:
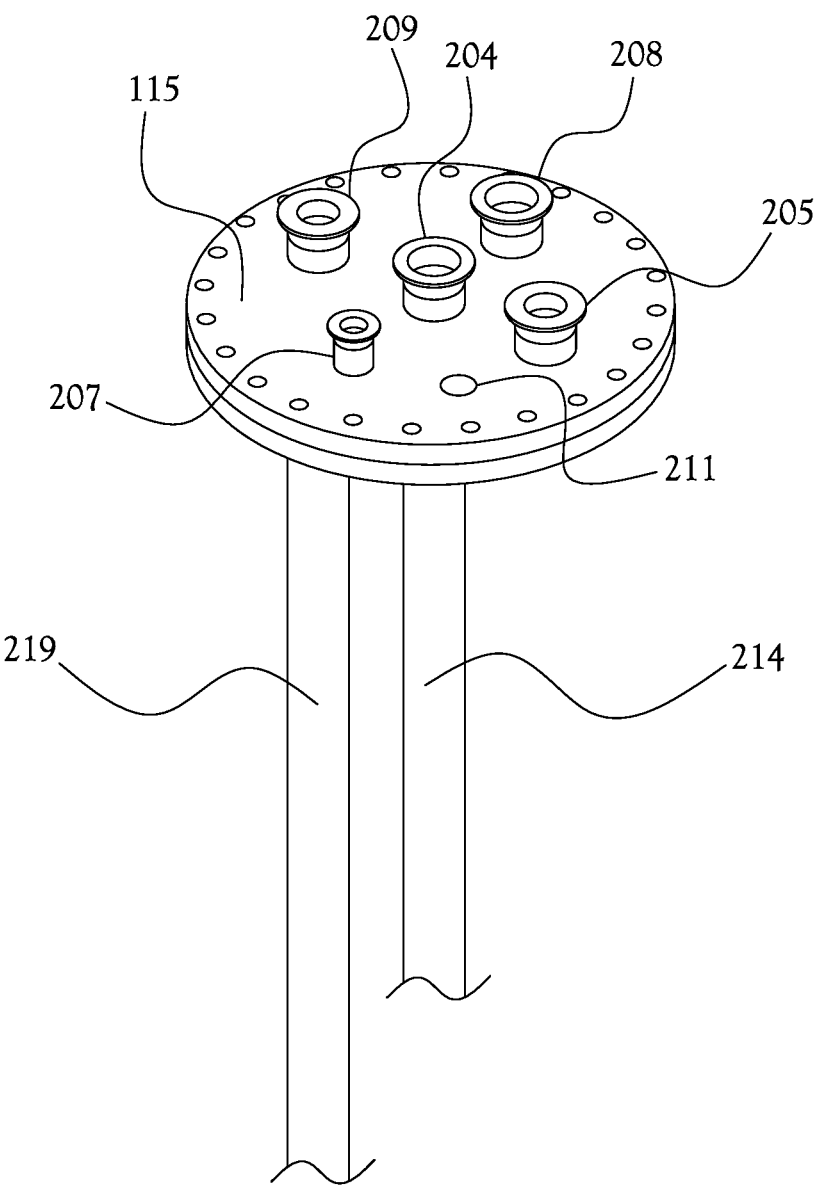
FIG. 4 is a top view of the inlet and outlet ports of the example embodiment vessel fill head shown in FIG. 3, with each port identified for function.
Figure 5:
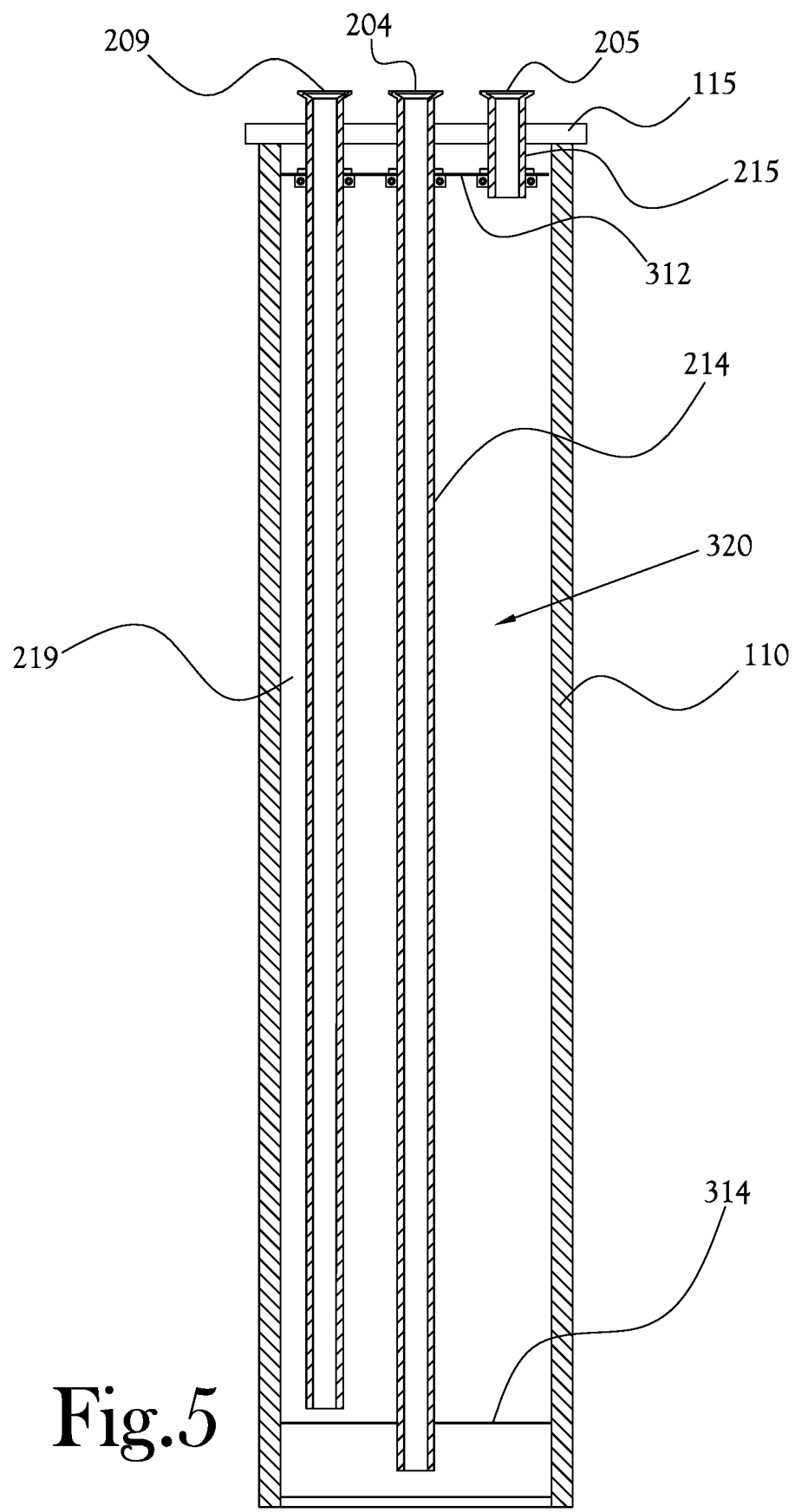
FIG. 5 is a cut away view of the example embodiment vessel with the feed inlet, sluice out and sluice in tubes shown in FIGS. 3 and 4.

As shown in FIG. 4 and a number of following figures, the fill head 115 includes a number of ports, including a waste water input port 204, a waste water output port 208, a media/sluice input port 205, a sluice water input port 207, a sluice output port 209, and a vent port 211. FIG. 5 shows of cross-section view of the interior of media process vessel 100, showing an upper media containment screen (or mesh) 312 near the top of the vessel 100 (or near the fill head 115) and a lower media containment screen (or mesh) 314. Generally, media to remove contaminants from the waste water is positioned in the media volume 320 defined by the tube housing 110 between the upper media containment screen 312 and the lower media containment screen 314.

As shown clearly in the section view in FIG. 5, the media/sluice input port 205 connects to a media/sluice input line 215 that extends just below the upper media containment screen 312; media added to the vessel 100 enters through the media/sluice input line 215 and floats toward the bottom of the media volume 320 from there. Once full with media, waste water (contaminated) enters through the waste water input port 204 and then travels within an internal waste water input line 214; within this input line 214, the waste water descends through the upper media containment screen 312, and downward through the entire vessel and through the lower media containment screen 314, just above the bottom of the vessel 100. In this way, the waste water is uniformly fed in the up-flow configuration through the lower screen 314, thus, fully utilizing the entire vessel 100 and bed of media. Typically, wire-wrap or wedge-wire lower internals are normally located well above the floor of the vessel within the media bed leaving a dead zone at the bottom of the vessel. The waste water, after passing through the media and upward through the vessel, passes through the upper media containment screen 312 and exits the system through the waste water outlet port 208, passing then to a product or effluent tank (as shown in FIGS. 1 and 2) or recycled to the pool/pond.

The waste water input port 204 can be piped or hosed (normally with quick connect sealable fittings) from a feed tank or from the fuel pool or other underwater source itself. The outlet or processed effluent water port 208 is located at the top of the vessel above the upper media containment screen 312. In some embodiments, treated waste water exiting the vessel is then piped or hosed back into the pool itself in recycle mode, thus achieving a decontamination factor over time versus a once through system.

Figure 6:
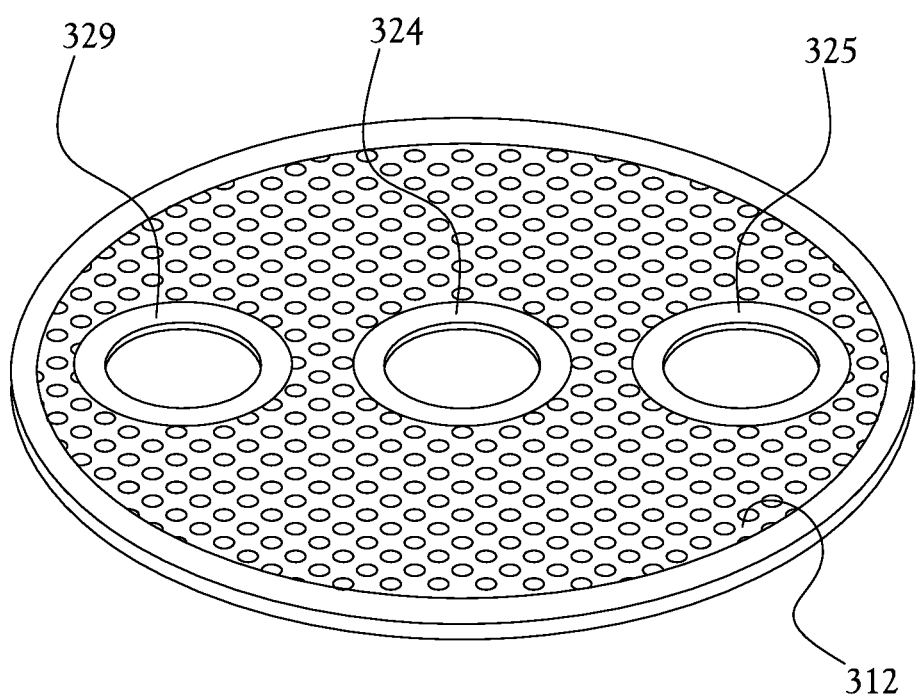
FIG. 6 is a top view of the upper containment screen.

Generally, upper media containment screen 312 and the lower media containment screen 314 are made of a perforated metal screen for support and are backed by a finer mesh screen which actually contains the media. FIG. 6 illustrates one example embodiment of an upper media containment screen 312 according to the general inventive concept. In the illustrated example embodiment, the upper media containment screen 312 includes a first port or aperture 324 facilitating through-passage of the internal waste water input line 214; a second port or aperture 325 facilitating through-passage of the media/sluice input line 215; and a third port or aperture 329 facilitating through-passage of a primary field effect eductor tube 219. The lower media containment screen 314 generally resembles the upper media containment screen 312, except that the lower media containment screen 314 generally requires only one port or aperture, to facilitate through-passage of the waste water input line 214 (as shown in FIG. 5).

Figure 7:
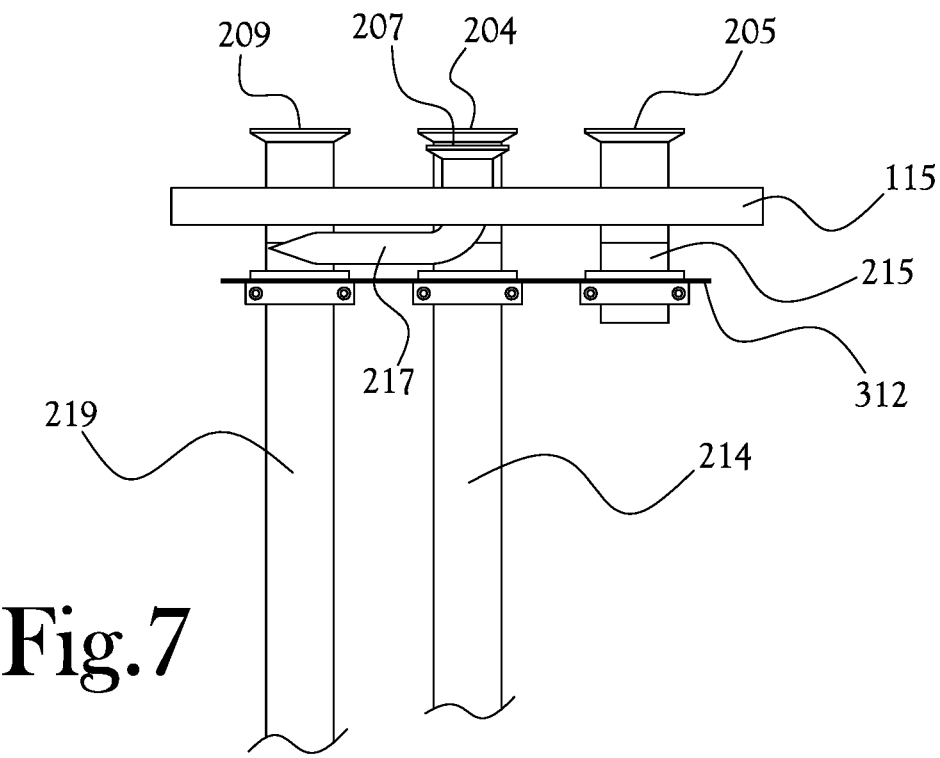
FIG. 7 is a side view of an example embodiment of the port and tube penetrations of the vessel fill head.
Figure 8:
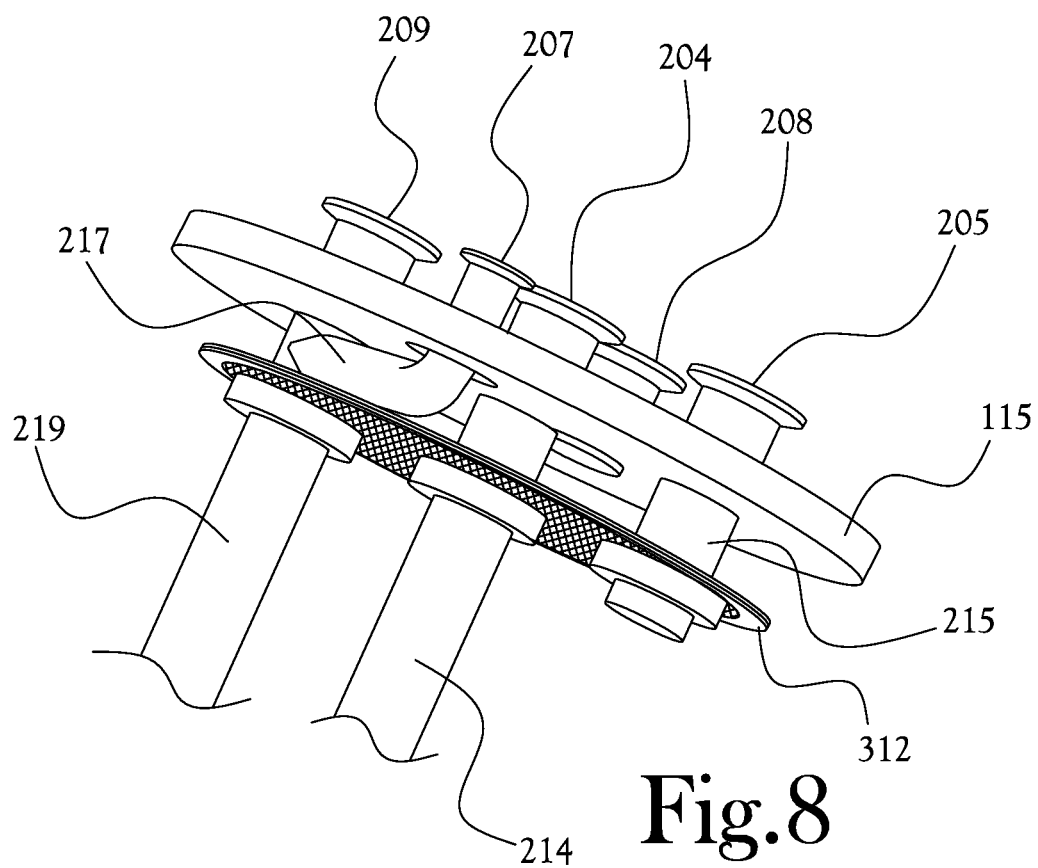
Figure 9:
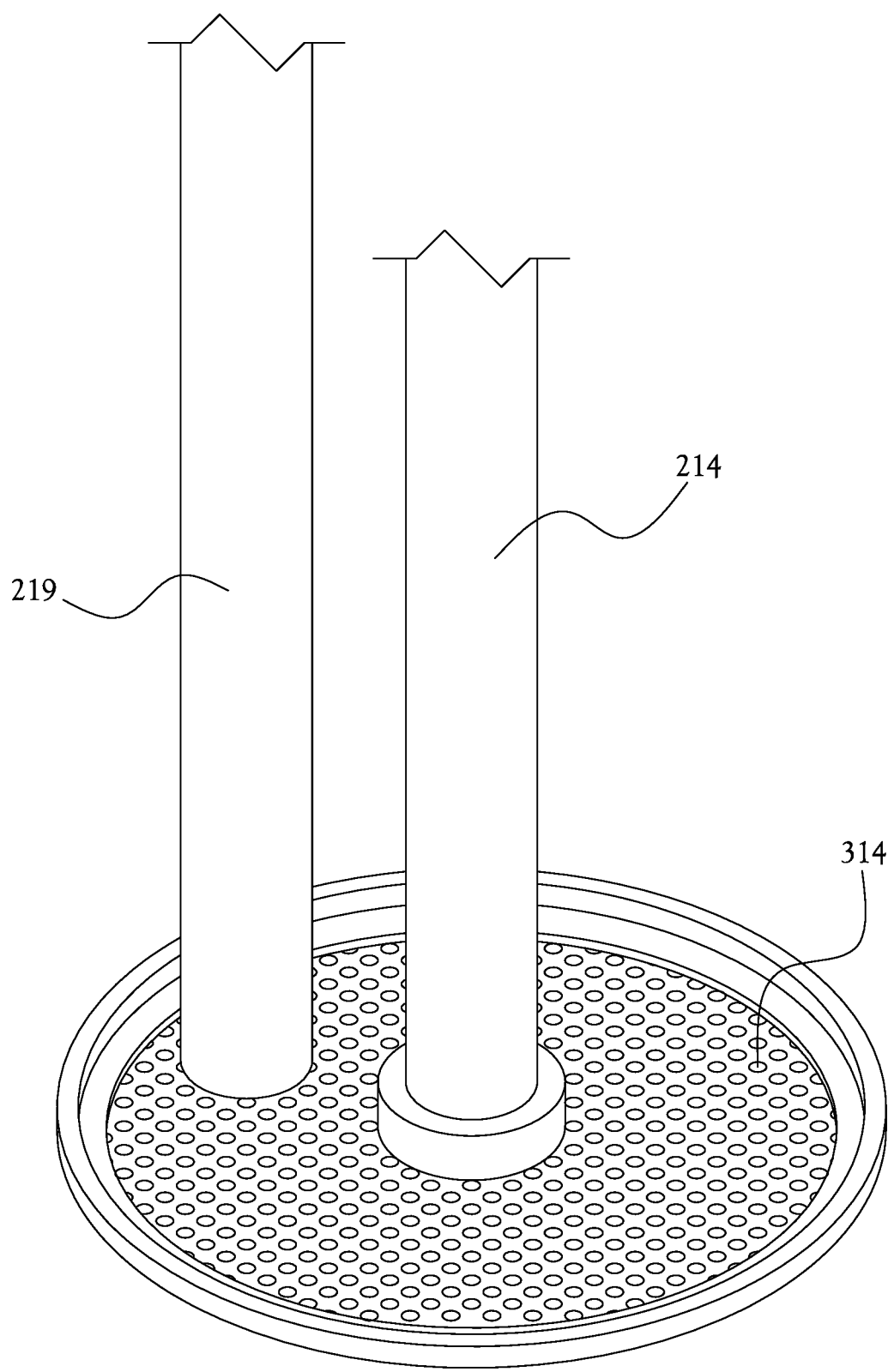
FIG. 9 is a side view of the lower containment screen, sluice out tube and feed in tube which penetrates the lower screen.
Figure 10:
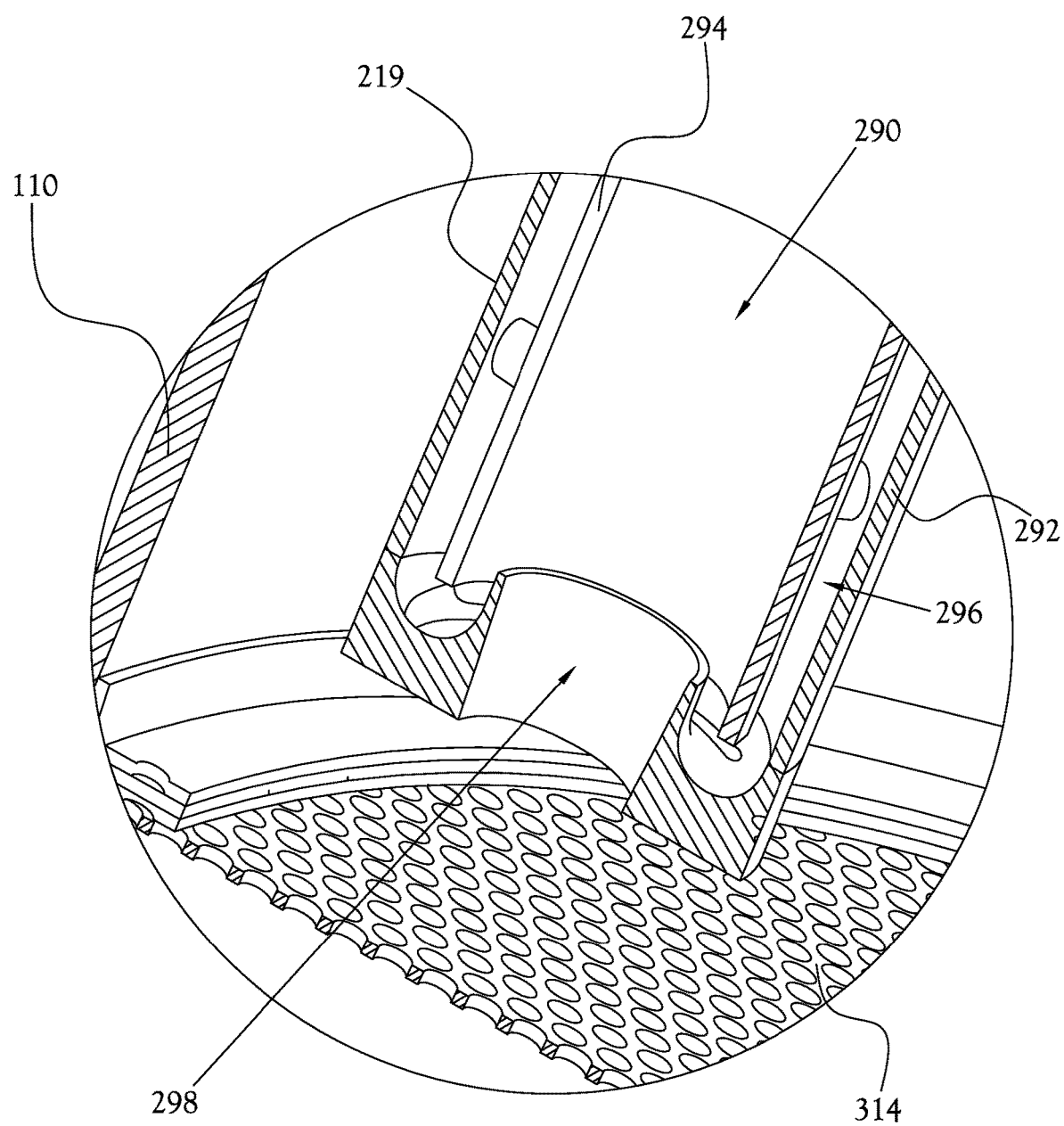
FIG. 10 is a close-up cross-section view of the interior of the tube housing just above the lower media containment screen, illustrating the sluice output tube including the internal field effect educator.

When the media is expended or spent, in order to reuse the vessel system and ancillary equipment, sluice water is introduced through the top sluice water input port 207 and through a side input line 217 into the primary field effect eductor tube 219 near the top of the vessel 100, as shown in FIGS. 7 and 8. The primary field effect eductor tube 219 (hereinafter generally "eductor tube" or "sluice out tube") extends for substantially most of the length or height of the vessel 100, as shown in the interior view in FIG. 9; the eductor tube 219 ends shortly before or above the lower media containment screen 314. Media is sluiced out of the media volume 320 within the vessel 100 by a high velocity flow down the sides of the eductor tube 219; as shown in the sectional view in FIG. 10, sluice water travels down the primary field effect eductor tube 219 through a volume 296 defined between the outer shell 292 and the inner shell 294 of the eductor tube 219 or annulus. The high velocity flow turns upward near the bottom of the eductor tube 219, forming a vacuum or suction at the bottom media inlet 298 at the bottom of the eductor tube 219 (which is located just above the bottom media containment screen 314). The media is thereby fluidized and, by suction, is mobilized up the inner channel 290 of the eductor tube 219 to above the fill head 115, where it is piped or hosed with quick connect style fittings to a spent media holding vessel (as shown in the flow diagrams in FIGS. 1 and 2) or through the secondary motive force eductor to the same end location.

This primary eductor tube can also have angled jets directing sluice water from the tube annulus out into the media bed to provide fluidization of the media to optimize the sluicing out operation at the suction nozzle. Further, the eductor tube can have angled jets directed inward and upward into the internal sluice tube to provide additional suction at the suction nozzle.

In some embodiments, the primary field effect educator includes outward jet nozzles along the lower portion of the eductor tube; these jet nozzles help to fluidize the media and to enable the suction inlet (at the bottom of the eductor tube) to suction all the media out of the vessel (rather than, for example, simply removing a cone of media immediately near the bottom of the eductor tube). Similarly, angled, inward and upward jets from the outer annulus can be directed into the center of the sluice out tube to promote suction at the bottom of the tube as well as upward fluid/media movement.

Figure 11:
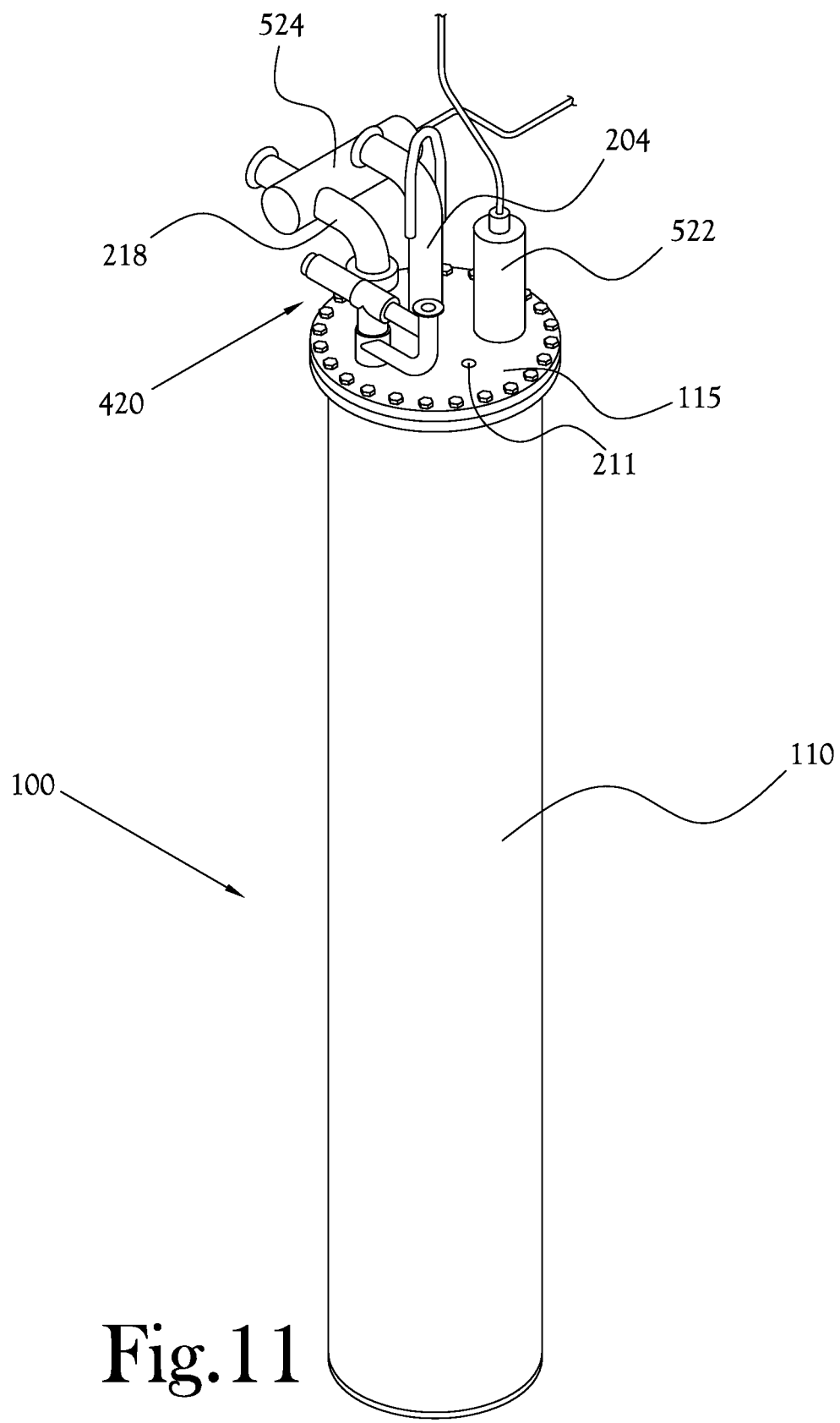
FIG. 11 is a perspective view of the entire vessel assembly complete with fill-head, ports and fittings.

Some embodiments of the present general inventive concept include additional components and features. FIG. 11 is a perspective view of the illustrated example embodiment media process vessel 100 (previously shown generally in FIG. 3) with additional equipment on the fill head 115. As shown in FIG. 11, the illustrated example embodiment system includes an (optional) secondary or supplemental motive force eductor pump (Venturi type) 420 (hereinafter "motive force educator" or "secondary educator") located on the fill head 115 at the top of the pressure vessel 100; generally, motive force educator 420 is attached to the sluice output port 209 shown in FIGS. 4, 7, and 8. Once the primary field effect eductor 219 begins the media movement, the motive force eductor 420 keeps the media fluidized and moving. The motive force eductor 420 precludes difficult media lodging in the sluice tube or exit pipe or hose—which can occur due to a slip stream effect wherein the water surpasses the media and the latter slows down or becomes less fluidized, resulting in plugging of lines (referred to as "sanding").

Figure 13:
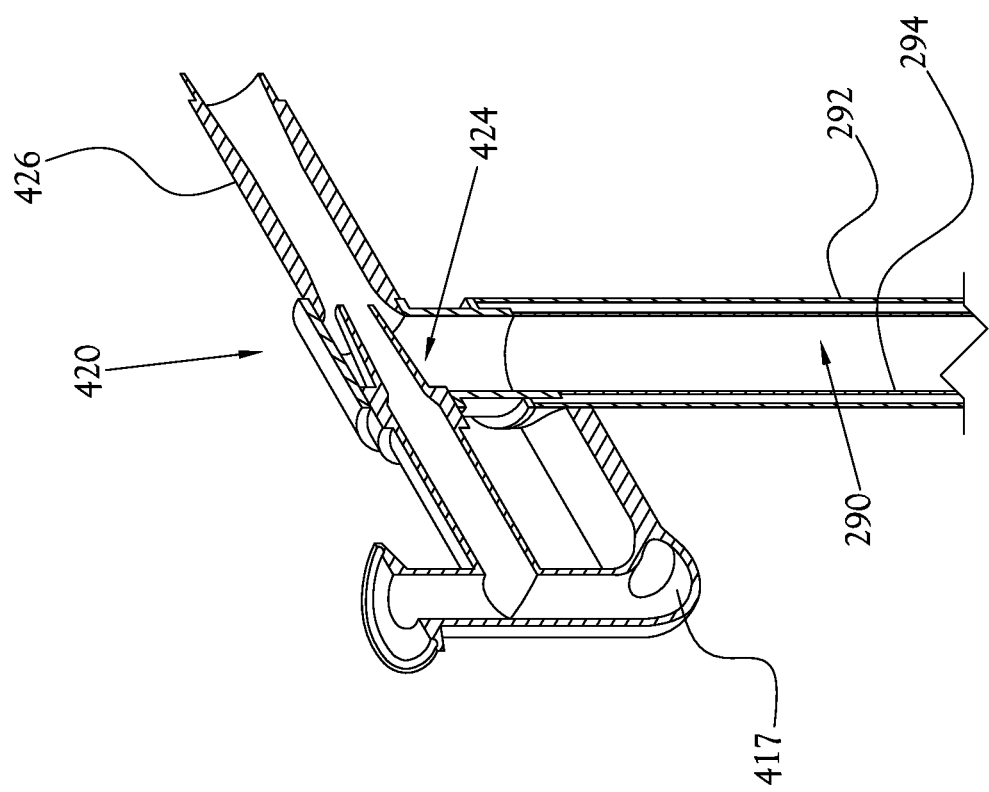
FIG. 13 is a cross-section view of the secondary and optional motive force eductor pump.
Figure 12:
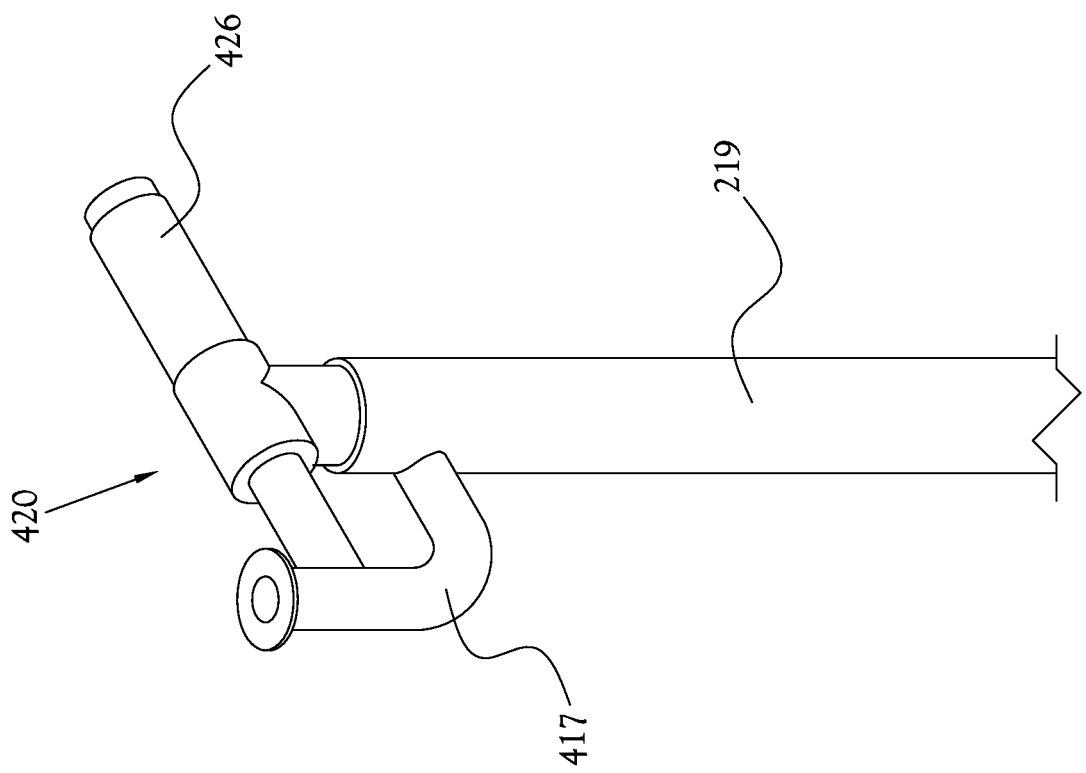
FIG. 12 is a view of an example embodiment of a secondary and optional motive force eductor pump located on the sluice out port.
Figure 14:
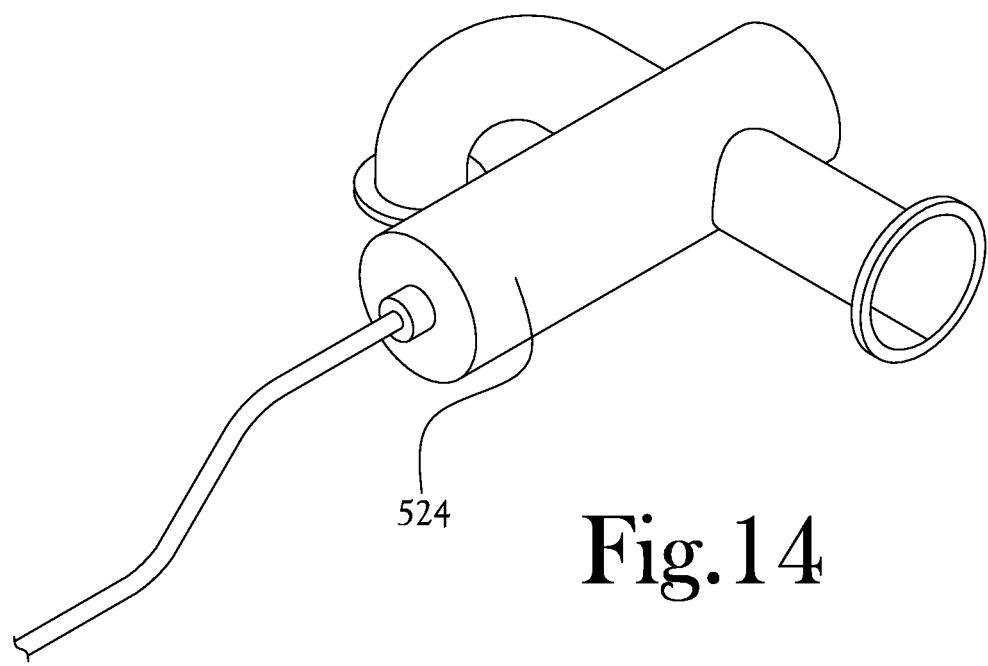
FIG. 14 is perspective view of an example embodiment of the gamma ray detector.

FIG. 12 shows a perspective stand-alone view of the motive force eductor 420 atop the educator tube 219, and FIG. 13 provides a cross-section view of the same subsystem. As seen in FIGS. 12 and 13, the motive force eductor 420 is connected to or at least in fluid communication with a sluice-out water supply line 417, which provides sluice-out water both to the primary field effect eductor 219 and to the Venturi-type constricted nozzle 424; passage of water through the Venturi-type constricted nozzle 424 into the sluice-out line 426 creates the additional suction to keep media fluidized and moving, as described above.

FIG. 11 also shows two radiation detectors or monitors operating with the system: a vessel radiation monitor 522, which measures and/or monitors radiation levels within the vessel; and an outlet radiation monitor 524, which measures and/or monitors radiation levels of the treated waste water or effluent emerging from the media and the vessel 100 through a treated waste water outlet line 218 (which in turn is attached to the treated waste water outlet port 208 shown in FIGS. 4 and 8). The vessel radiation monitor 522 measures, during operation, how contaminated the media itself is getting; outlet radiation monitor 524 detects if there is breakthrough of contamination in the effluent (indicating that the media is spent). Monitoring the radioactivity of the media and/or effluent can help keep the media from becoming too hot (i.e. too high a dose for handling later) or from having an unacceptable level of contamination in the treated water (effluent). Radiation monitoring also alerts an operator of the system that it is time to change out the media or advance the sequence of the vessels in applications utilizing multiple, or lead-lag, vessels. In some embodiments, the vessel radiation monitor 522 and the outlet radiation monitor 524 are gamma monitors; however, those of skill in the art will recognize that other types of radiation monitors or radiation detectors are possible in this setup, and these alternate arrangements fall within the ambit of the present general inventive concept.

Figure 15:
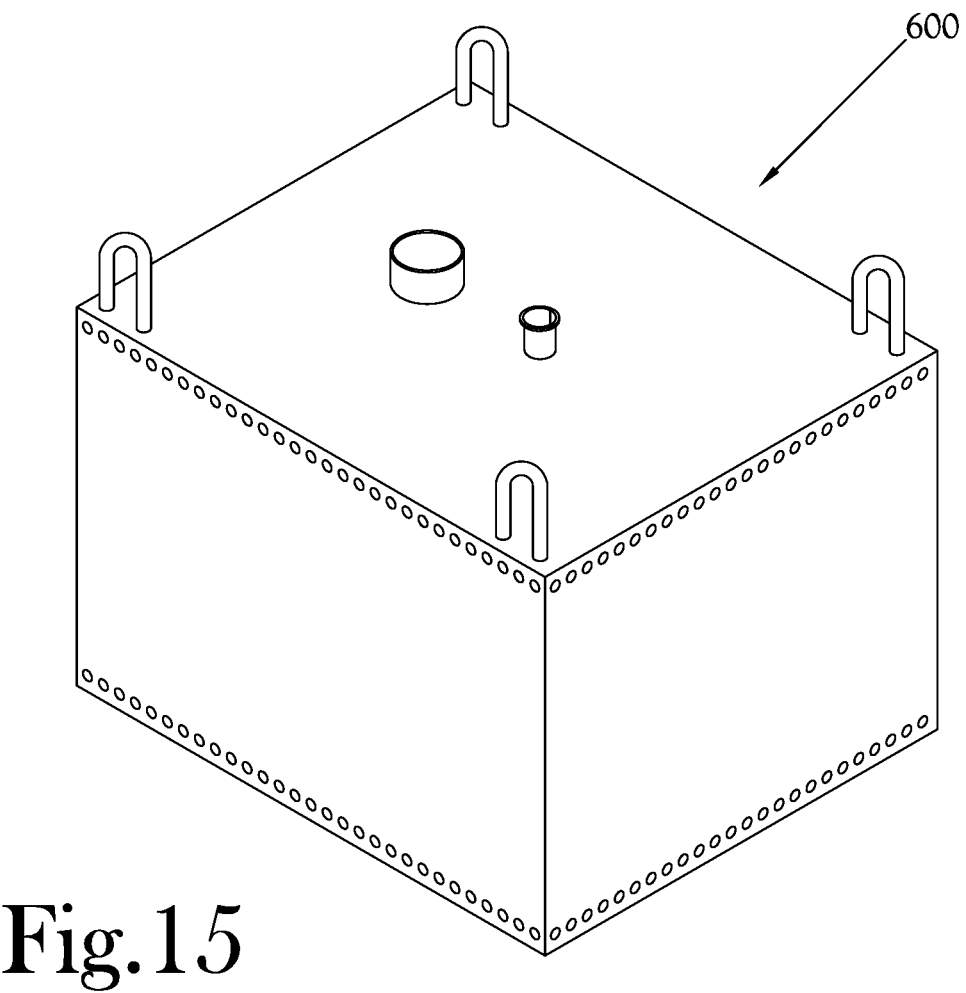
FIG. 15 is a view of a sluiced resin capture and containment screened box which is designed to fit into an underwater pond skip shown in FIG. 16.
Figure 16:
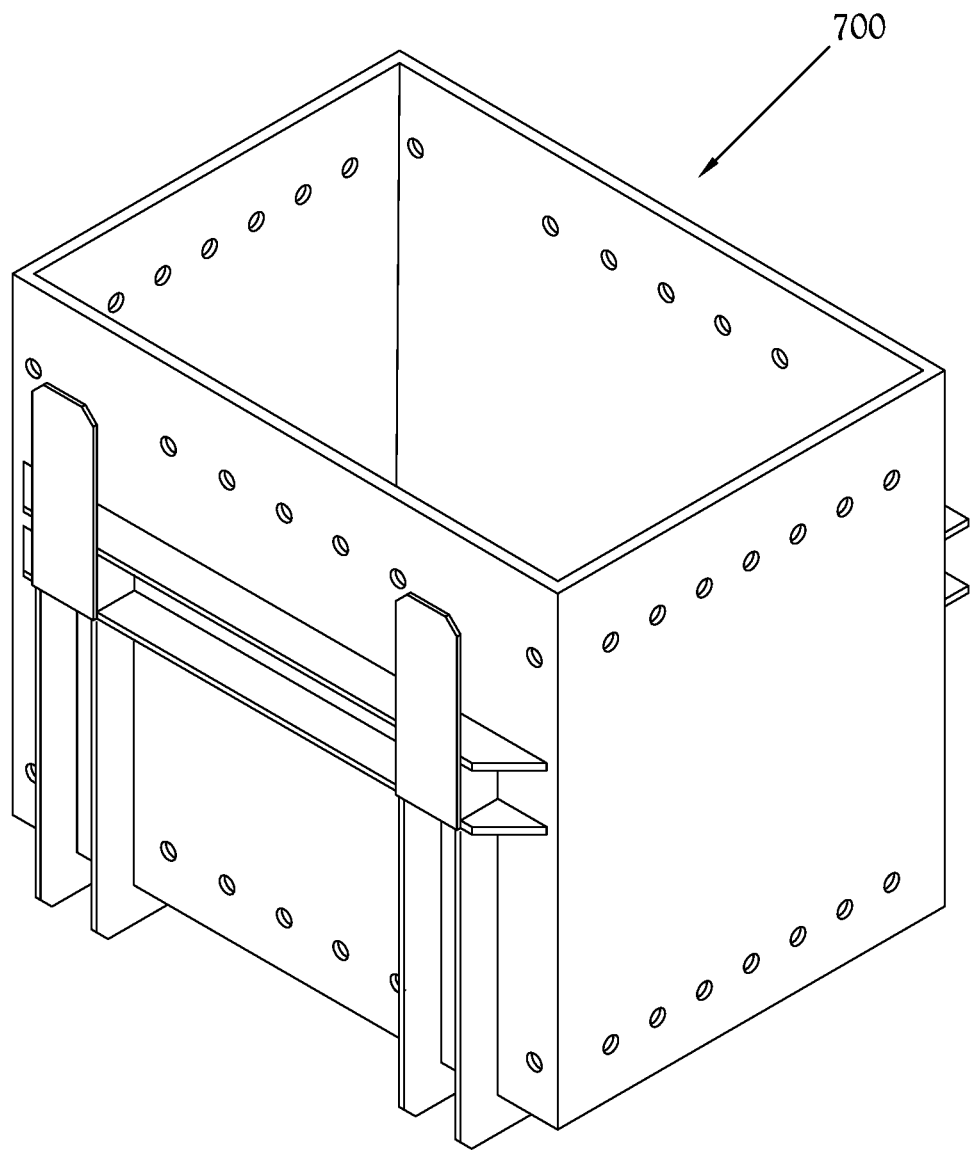
FIG. 16 is a perspective view of one example embodiment of an underwater pond skip for use with a spent media cage in the submersible set up illustrated in FIG. 2.

The waste containment holding vessel for receiving spent media may be one of any type of dewaterable container from a simple vessel, to a High Integrity Container (HIC); or, for fully underwater operations, a screened box fitted within a submersed containment box, sometimes referred to as a pond skip. FIG. 15 is a view of a sluiced resin capture and containment screened box 600; this screened box 600 is designed to fit into an underwater pond skip 700, shown in FIG. 16. Pond skips are simple, open top boxes utilized for holding contaminated hardware on the pool floor. The screened box 600 (likened to a crab or lobster pot) within the pond skip 700 has a removable top for ease of further treating the spent media by solidification, stabilization, thermal processing, etc. Further, the top of the screened box

600 generally includes a media sluice in port to introduce the media into the screened box 600. The sluice water exits the screened box 600 through thousands of small perforated and screened openings back into the pool itself; all the while, the screened box 600 continues to contain the (spent) media.

Once the box within a box is full of media, it can be stored underwater for shielding purposes; or, if being taken to further treatment or disposal, can simply be lifted and drained into the box or pool. Further, to accelerate drying of the media, air or warm air can be introduced into the sluice media port at the top of the screened box.

Thus, in various example embodiments of the present general inventive concept, a surface or submersible sluiceable system to remove selected hazardous contaminants or radioactive isotopes from fluid waste materials encompasses a waste fluid processing vessel to hold media, said media to remove selected hazardous contaminants or radioactive isotopes from fluid waste materials when the fluid waste materials are passed through said waste fluid processing vessel, said waste fluid processing vessel including a vessel body having an interior; a fill head having a plurality of ports giving access to the interior of said vessel body, including a fluid waste material input port, a fluid waste material output port, a sluice-in port to facilitate delivery of media to the interior of said vessel body, and a sluice-out port; internal media containment screens; a volume to contain said media, said volume being defined by said vessel body and said internal media containment screens; an internal waste fluid line to deliver fluid waste materials from said fluid waste material input port to a location within the interior of the vessel body, said location being placed such that fluid waste materials exiting the internal waste fluid line pass through said media before exiting the interior of the vessel body through said fluid waste material output port; a sluice-in tube to deliver media into the vessel during filling; and a sluice-out tube to remove media from the vessel, said sluice-out tube including a field effect eductor to fluidize and pump media out of the interior of said vessel body.

Some embodiments further include an exit tube near the fill head to convey away from the vessel treated fluid waste materials exiting the interior of the vessel body through said treated fluid waste material output port.

Some embodiments further include a vent opening to prevent any air or pressure build up within the vessel during filling or operation (vent port).

Some embodiments further include a secondary motive force eductor pump installed proximate the sluice-out port on said fill head, said secondary motive force eductor pump to maintain fluidization and movement of media during removal of media from the vessel, whereby when the field effect eductor fluidizes and moves the media out of the vessel, said secondary motive force eductor pump maintains the fluidization of the media and keeps the media moving, preventing settling or plugging.

Some embodiments further include at least one radiation monitor to monitor radiation levels within the vessel or within treated fluid waste materials exiting the interior of the vessel body through said fluid waste material output port.

In some embodiments, at least one radiation monitor includes a gamma monitor.

In some embodiments, said radiation monitor monitors radiation levels within the vessel.

In some embodiments, said radiation monitor monitors radiation levels within treated fluid waste materials exiting the interior of the vessel body through said treated fluid waste material output port.

In some example embodiments of the present general inventive concept, a surface or submersible sluiceable system to remove selected hazardous contaminants or radioactive isotopes from liquid waste materials includes a media containment and processing vessel including a main vessel body, a fill head containing waste water in, processed effluent water out, sluice in, sluice out, sluice water and vent ports; internal media containment screens to hold media; internal piping to deliver the waste water up flow to the media from below, exit tube at the top to deliver the processed water out of the vessel, sluice in tube to deliver media into the vessel during filling, sluice out tube to deliver the media out of the vessel which also houses a field effect eductor at the bottom of the bed to fluidize and pump the media out of the vessel, sluice water tube that feeds the field effect eductor within the sluice out tube; and vent opening to prevent any air or pressure build up within the vessel during filling or operation; a secondary motive force eductor pump installed on the sluice out port, said secondary motive force eductor pump to maintain fluidization and movement of media so that, when the field effect eductor fluidizes and moves the media out of the vessel, the eductor pump maintains this fluidization and keeps the media moving, preventing settling or plugging; and monitors to monitor when the media is expended or spent.

In some embodiments, said media comprise a granular or inorganic material.

In some embodiments, said media include organic ion exchange resin.

In some embodiments, the system is reusable while only the media is removed.

In some embodiments, the sluiced media, after removal from media containment and processing vessel, is conveyed to a surface spent resin container or fed into an underwater resin container.

In some embodiments, the fill head and entire vessel assembly is removable.

In some embodiments, multiple vessels are used in series.

In some example embodiments of the present general inventive concept, a surface or submersible sluiceable system to remove selected hazardous contaminants or radioactive isotopes from liquid waste materials includes a media containment and processing vessel consisting of a main vessel body, a fill head containing waste water in, processed effluent water out, sluice in, sluice out, sluice water and vent ports; internal media containment screens (top and bottom) to hold the media bed in place; internal piping to deliver the waste water up flow to the media from below, exit tube at the top to deliver the processed water out of the vessel, sluice in tube to deliver media into the vessel during filling, sluice out tube to deliver the media out of the vessel which also houses a novel field effect eductor at the bottom of the bed to fluidize and pump the media out of the vessel, sluice water tube that feeds the field effect eductor within the sluice out tube; and, vent opening to prevent any air or pressure build up within the vessel during filling or operation; external piping that matches all the internal tubes and ports (such ports are connected to hoses [or pipes] with quick disconnect connections, camlock type fittings, sanitary fittings or the like); a secondary and optional motive force eductor pump can be installed on the sluice out port so, that when the field effect eductor fluidizes and moves the media out of the vessel, the motive force eductor pump maintains this fluidization and keeps the media moving, preventing settling or plugging in the lines; and external instrumentation, such as gamma monitors, can be attached to the fill head itself and/or the process effluent water out in order to monitor when the media is expended or spent preventing too high a level on the media or an inadequate contaminant removal resulting in an unacceptable product water for discharge.

In some embodiments, said media comprise a granular and/or inorganic material.

In some embodiments, said media include standard, organic ion exchange resin.

In some embodiments, the system is reusable while only the media is expended, sluiced out and stored, treated and/or disposed of.

In some embodiments, the system can be fed from a surface feed tank or can be fed from the under-water source itself on a recycle mode of operation.

In some embodiments, the system can feed the sluiced media to a surface spent resin container or can feed it to an underwater resin container for later dewatering, further treatment and/or disposal.

In some embodiments, the system can be connected either under water or in air to the pumping and delivery system by quick connect hoses.

In some embodiments, the system can have the fill head removed and the entire internal assembly removed for either decontamination, repair or replacement.

In some embodiments, the system can be used as a single vessel or multiple vessels in series in the conventional lead-lag system operational mode thus fully utilizing the media as well as optimizing the quality of the discharge water.

FIGS. 17-23 represent specific implementations of the lead-lag system where multiple vessels are used on the surface or subsurface, thus under water, to fully utilize the media. The media is preferably inorganic, such as mineral based. Thus, two or more vessels can be used in a consecutive or series manner to enhance complete exhaustion of the media before the media is sluiced from the most-used vessel and replaced. While such a system can be implemented on the surface, thus not submerged, by manually shifting hoses between vessel ports or with an adequately complex valving system, such a system would be difficult to implement underwater. The described system allows for 2 or more vessels with effluent flow sequencing controlled by an external control panel and a vessel rotating assembly positioned above the fill heads of the 2 or more vessels or at the bottom of the 2 or more vessels.

When two or more vessels are used in series, a first vessel is pumping its effluent to a second, a configuration that may be referred to as "lead-lag". When more than two vessels are used in series, the first vessel pumps effluent to the second, the second pumps to a third, the third pumps to a fourth, and so on.

The ability of the first vessel to pump effluent to the second and subsequent vessels is made possible by a pumping system capable of generating adequate pressure, whether in the form of a single pump or in the form of multiple pumps. Preferably, the pumps are operated to maintain a positive pressure between the vessels, as attempting to move effluent between the systems with negative pumping pressure is less preferred. The system also allows for the most decontaminated effluent within the system to contact the least exhausted media before exiting the system, thus providing the most effluent decontamination possible with the available media. Such operation reduces the likelihood that highly contaminated media will release contaminants into a less contaminated effluent stream.

Figure 17:
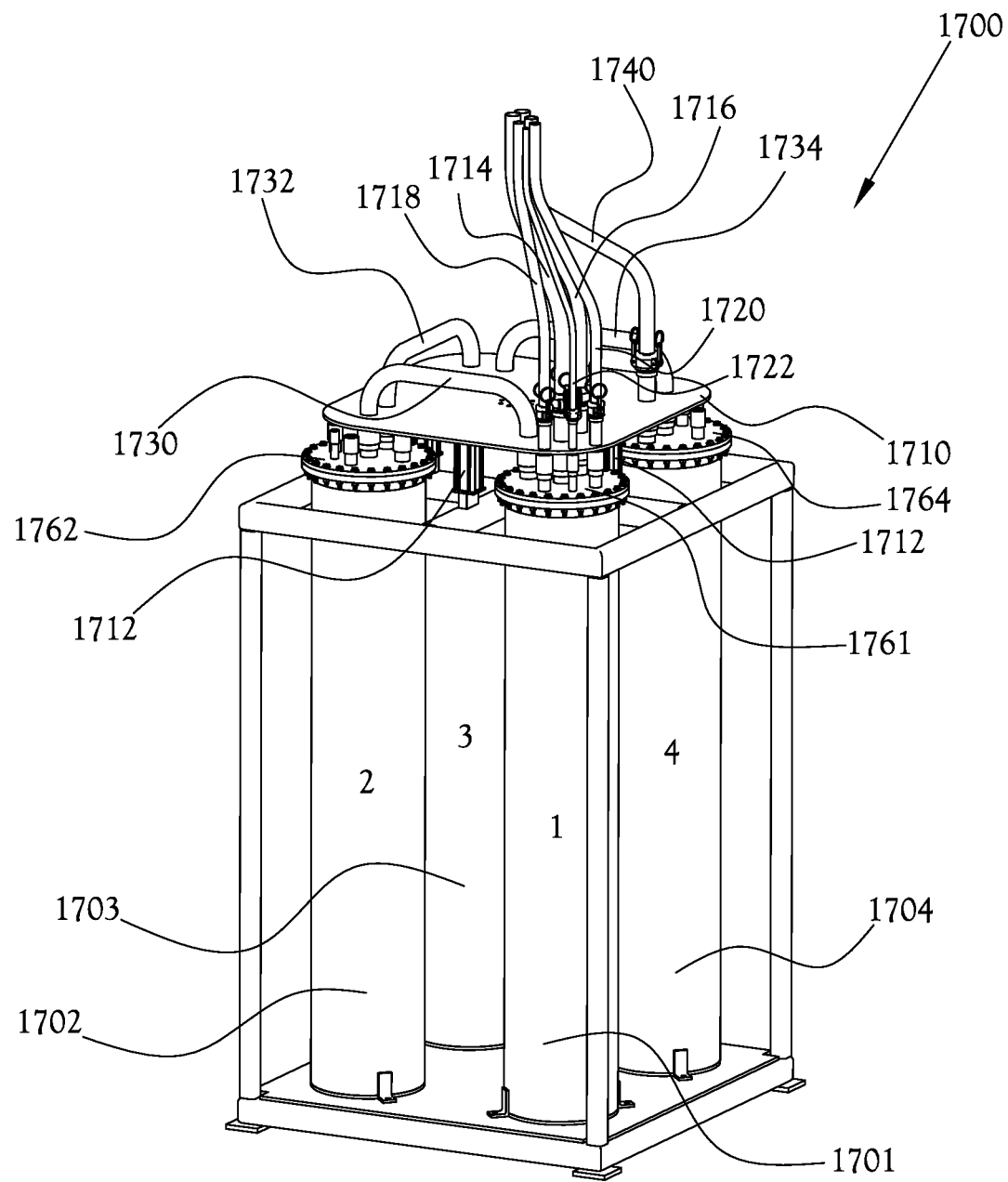
FIG. 17 represents a four-vessel decontamination system having fixed vessels with a top rotary manifold.

FIG. 17 represents a four-vessel decontamination system 1700 having fixed vessels with a top rotary manifold 1710. As represented, first vessel 1701 is in fluid communication with a primary water inlet 1714, a media inlet 1716, a media outlet 1718, and a sluice water inlet 1720. Gas vent 1722 may be included to relieve unwanted gas or air pressure that generated during the decontamination process or from pump pressurization of the system.

Contaminated water enters the first vessel 1701 through the primary water inlet 1714, transfers through first transfer tube 1730 to second vessel 1702, then transfers through second transfer tube 1732 to third vessel 1703, then transfers through third transfer tube 1734 to fourth vessel 1704, where the now decontaminated water exits the system 1700 through treated water outlet 1740. While not shown in the figure, the transfer tubes could be omitted and treated water outlet 1740 connected to the first vessel 1701, as previously discussed regarding the single vessel system if the system were configured to use one single vessel at a time.

Flow of the contaminated water into the primary water inlet 1714 and out through the treated water outlet 1740 may then be stopped and spent media in the first vessel 1701 replaced with fresh media. Such spent media replacement occurs through sluicing fresh media in through the media inlet 1716 after sluicing spent media out through the media outlet 1718 in response to pressurized water being sent through the sluice water inlet 1720 to activate the field effect eductor of each vessel (not shown).

After the media in the first vessel 1701 is replaced, lifting mechanism 1712 lifts the top rotary manifold 1710 for rotation by a rotator (not shown), and then lowers the top rotary manifold 1710 so the primary water inlet 1714 moves to the second vessel 1702 and the treated water outlet 1740 moves to the first vessel 1701. Hence, the first vessel 1701 including the least contaminated media is connected to the treated water outlet 1740.

The media replacement of the vessel in fluid communication with the primary water inlet 1714, lifting, and rotating of the top rotary manifold 1710 may continue so the primary water inlet 1714 moves to the third vessel 1703 and the treated water outlet 1740 moves to the second vessel 1702. The primary water inlet 1714 then moves to the fourth vessel 1704 and the treated water outlet 1740 moves to the third vessel 1703. The cycle repeats as the next rotation places the primary water inlet 1714 to the first vessel 1701 and the treated water outlet 1740 to the fourth vessel 1704. While clockwise rotation in described and represented in the following figures, the system 1700 also may implement counter-clockwise rotation.

If the transfer tubes are omitted and the treated water outlet 1740 outlet connected to the same vessel as the primary water inlet 1714, the vessels may be used individually. In either operation, fill heads 1761, 1762, and 1764 of the vessels remain stationary while the rotary manifold 1710 moves.

Figure 18:
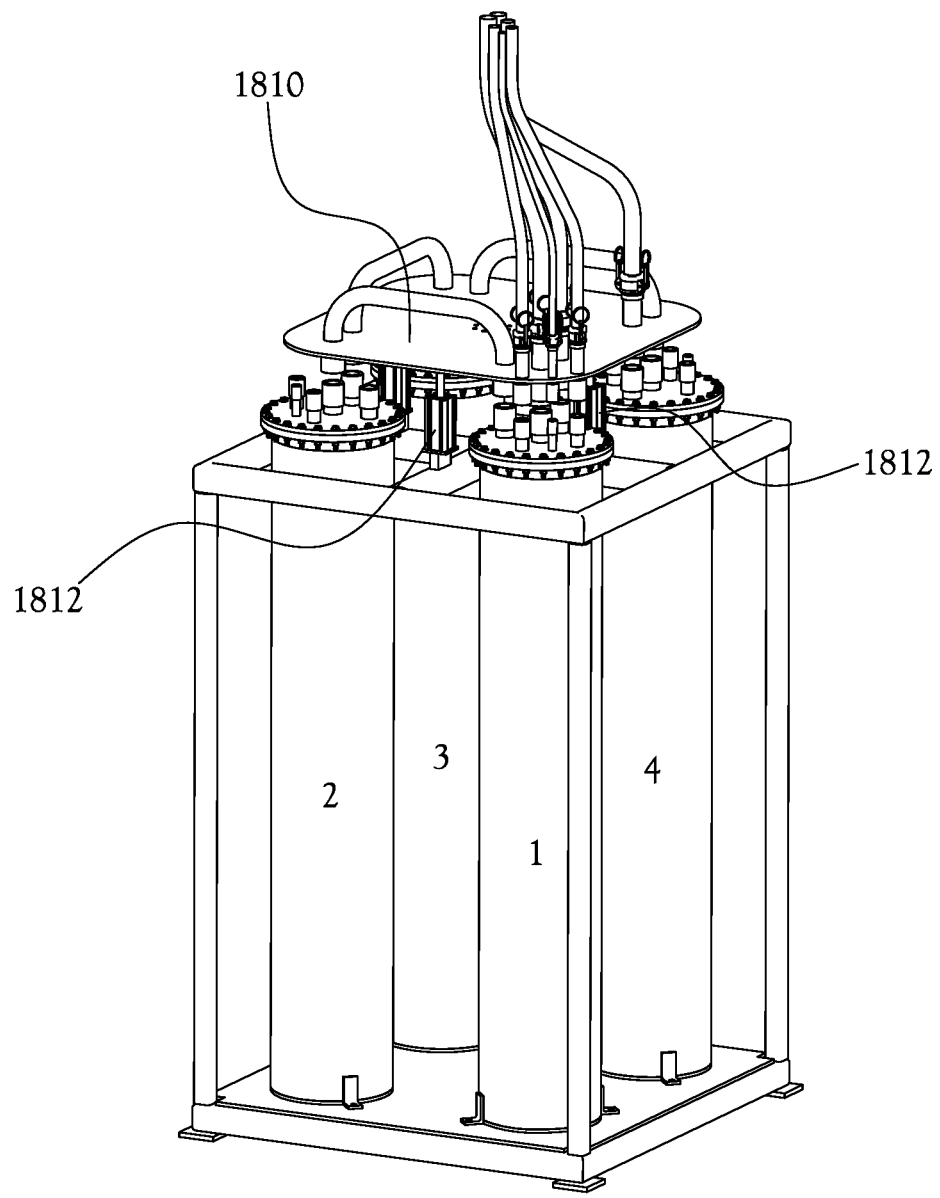
FIG. 18 represents the decontamination system where lifting mechanism has placed top rotary manifold in the raised, disconnected position.

FIG. 18 represents the decontamination system 1700 where lifting mechanism 1812 has placed top rotary manifold 1810 in the raised, disconnected position where the top rotary manifold 1810 may rotate. As the vessels are fixed, the position of the vessels in relation to each other does not change.

Figure 19:
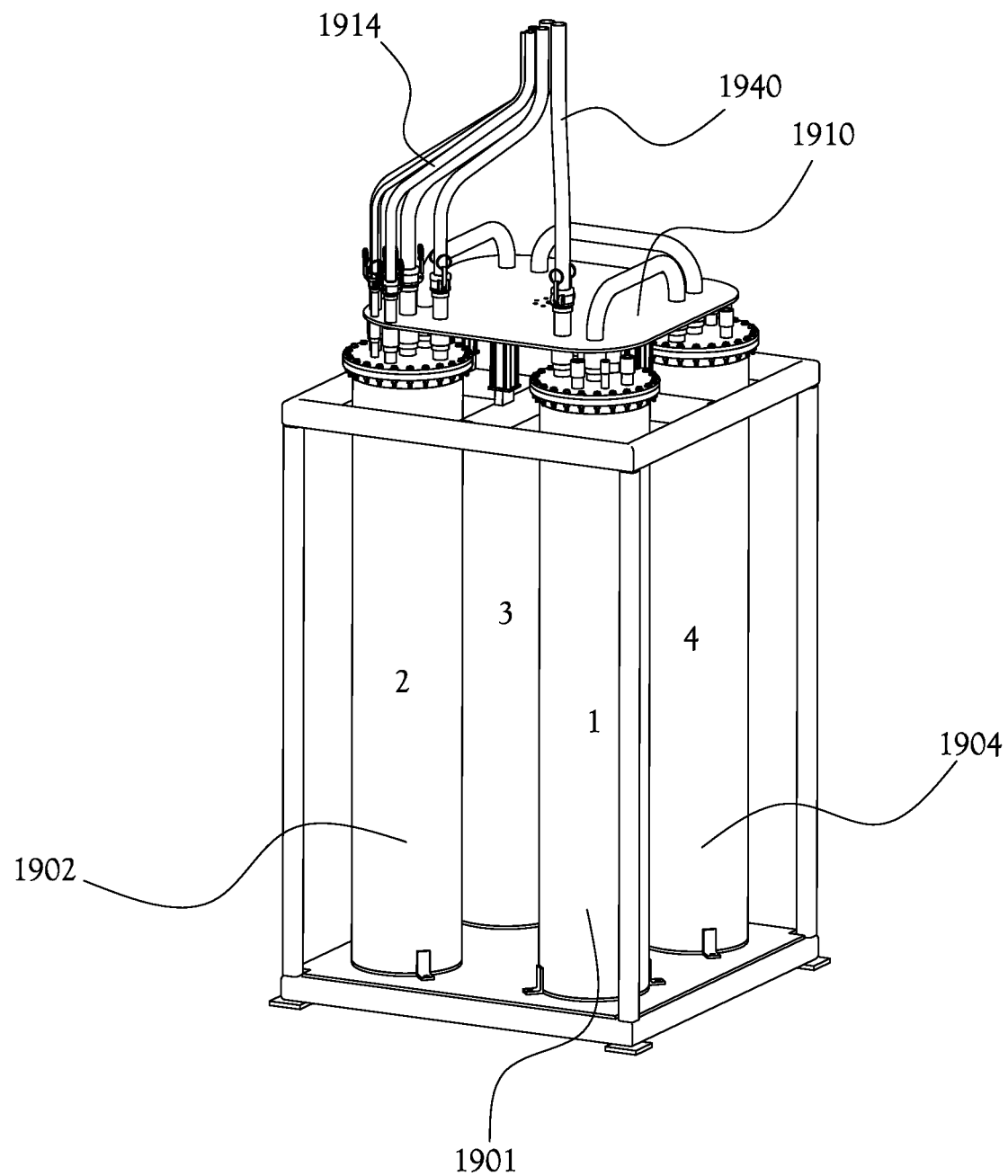
FIG. 19 represents the decontamination system after the rotating mechanism (not shown) has rotated top rotary manifold one position clockwise, thus moving primary water inlet from first vessel to second vessel and treated water outlet from fourth vessel to the first vessel.

FIG. 19 represents the decontamination system 1700 after the rotating mechanism (not shown) rotates top rotary manifold 1910 one position clockwise, thus moving primary water inlet 1914 from first vessel 1901 to second vessel 1902 and treated water outlet from fourth vessel 1904 to the first vessel 1901.

Figure 20:
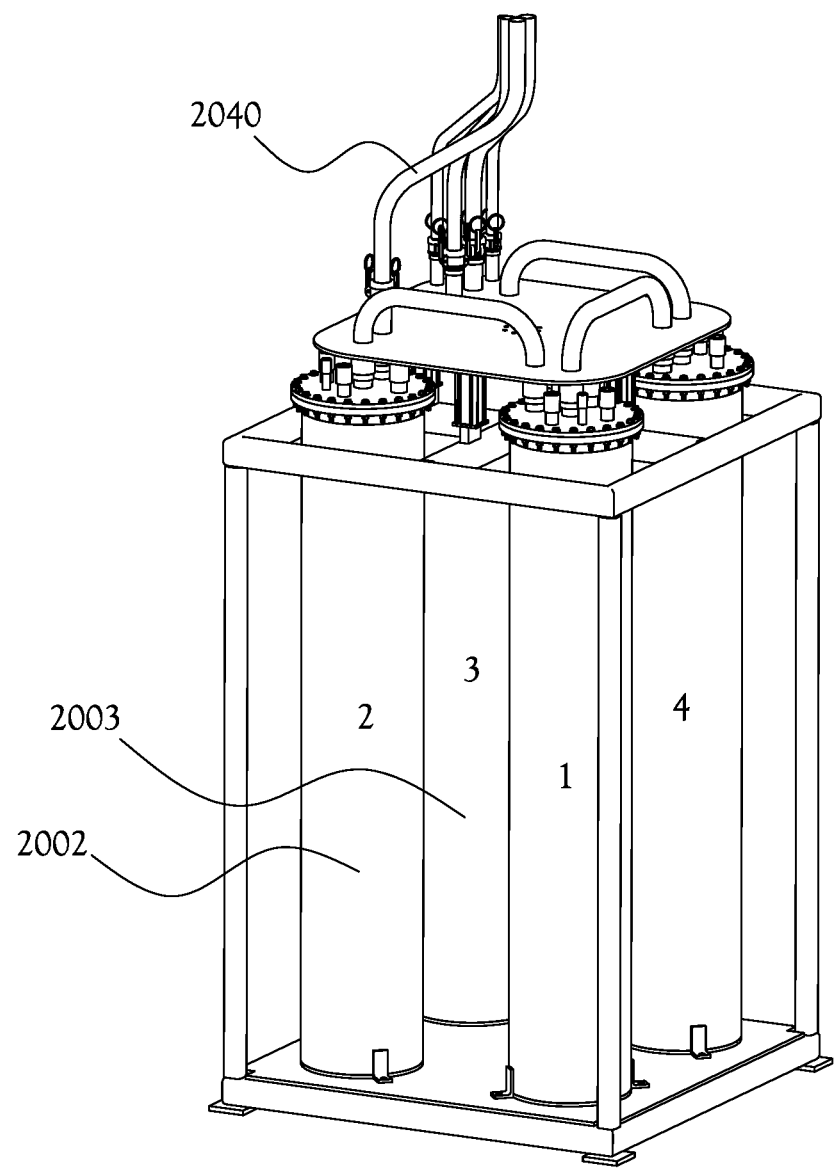
FIG. 20 represents moving the top rotary manifold another position clockwise.

FIG. 20 represents moving the top rotary manifold another position clockwise, where the water to be decontaminated first enters vessel 2003 and the decontaminated water exits from vessel 2002 through treated water outlet 2040.

Figure 21:
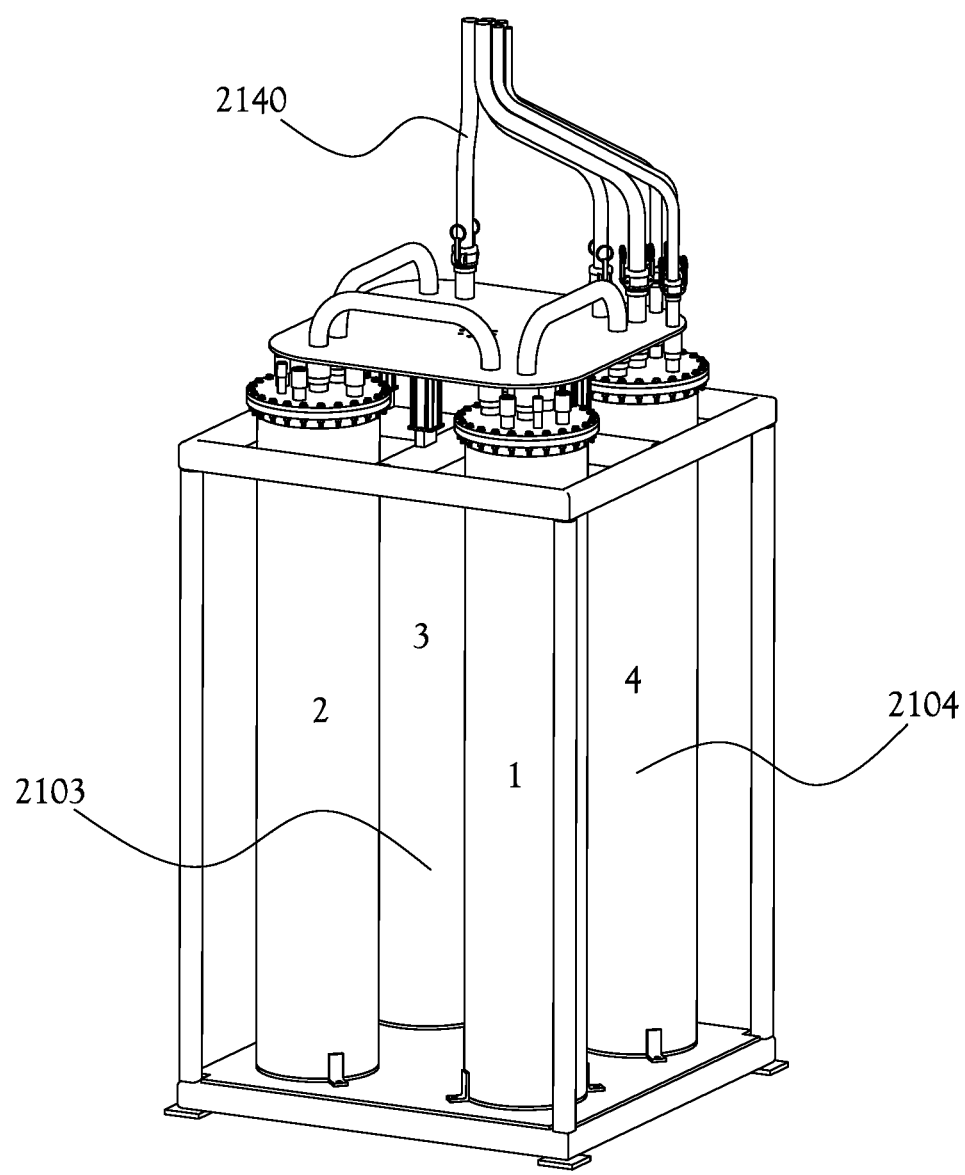
FIG. 21 represents moving the top rotary manifold another position clockwise.

Similarly, FIG. 21 represents moving the top rotary manifold another position clockwise, where the water to be decontaminated first enters vessel 2104 and the decontaminated water exits from vessel 2103 through treated water outlet 2140.

Figure 22:
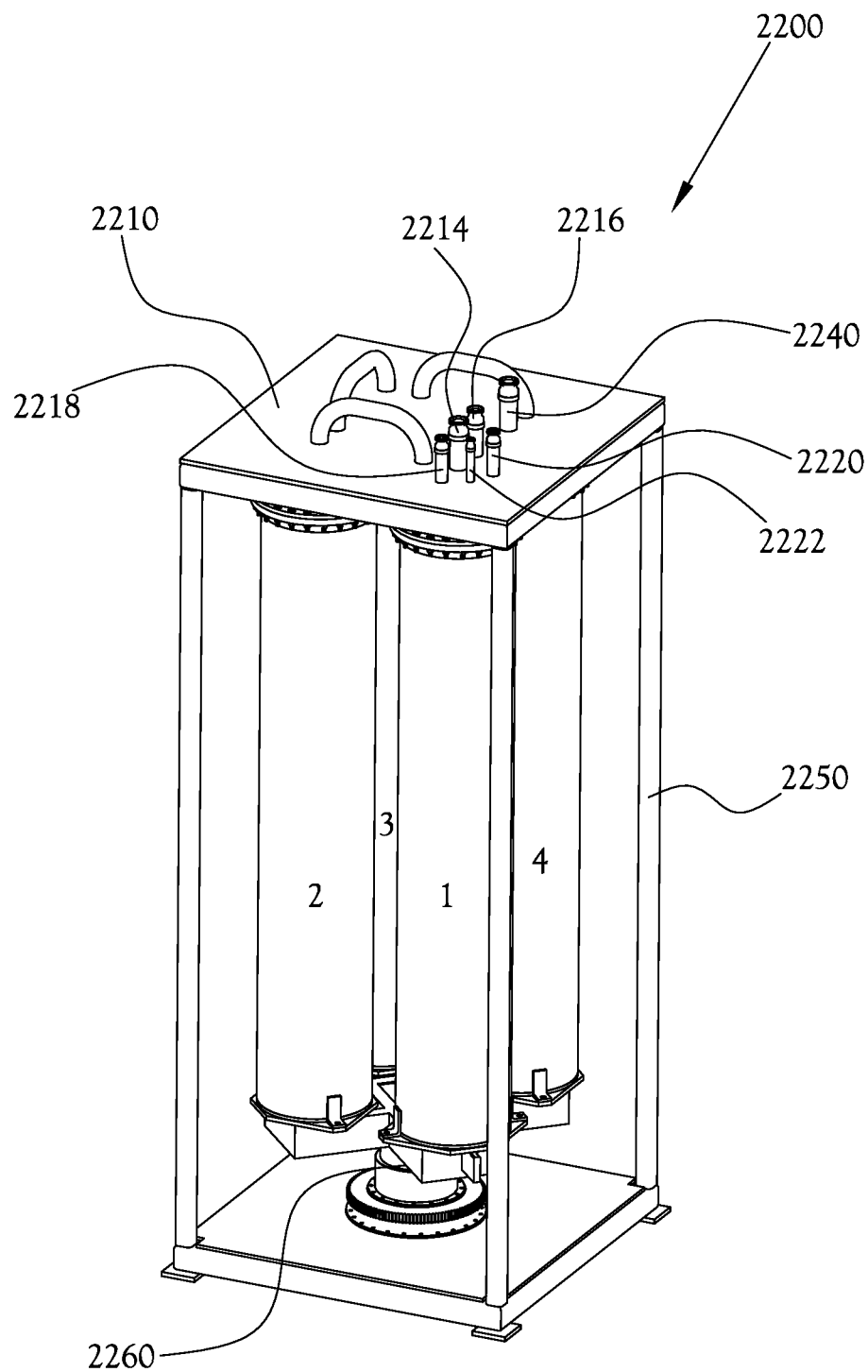
FIG. 22 represents a four-vessel decontamination system having rotating vessels with a fixed top manifold.

FIG. 22 represents a four-vessel decontamination system 2200 having rotating vessels with a fixed top manifold 2210. The fixed top manifold does not rotate, instead being fixed, such as to frame 2250. The multiple connections to the fixed top rotary manifold 2210 are omitted for clarity but are as previously described. The system 2200 has substantively the same operation as the system 1700, except that lifting and rotation device 2260 connects, rotates, and disconnects the vessels from the fixed top rotary manifold 2210, as opposed to connecting, rotating, and disconnecting the top rotary manifold from the vessels.

The system 2200 includes the fixed top manifold 2210, where primary water inlet 2214, treated water outlet 2240, media inlet 2216, media outlet 2218, sluice water inlet 2220, and optional gas vet 2222 are fixed to the fixed top manifold 2210. The system 2200 includes transfer tubes placing the vessels in fluid communication as previously discussed in relation to the system 1700.

Figure 23:
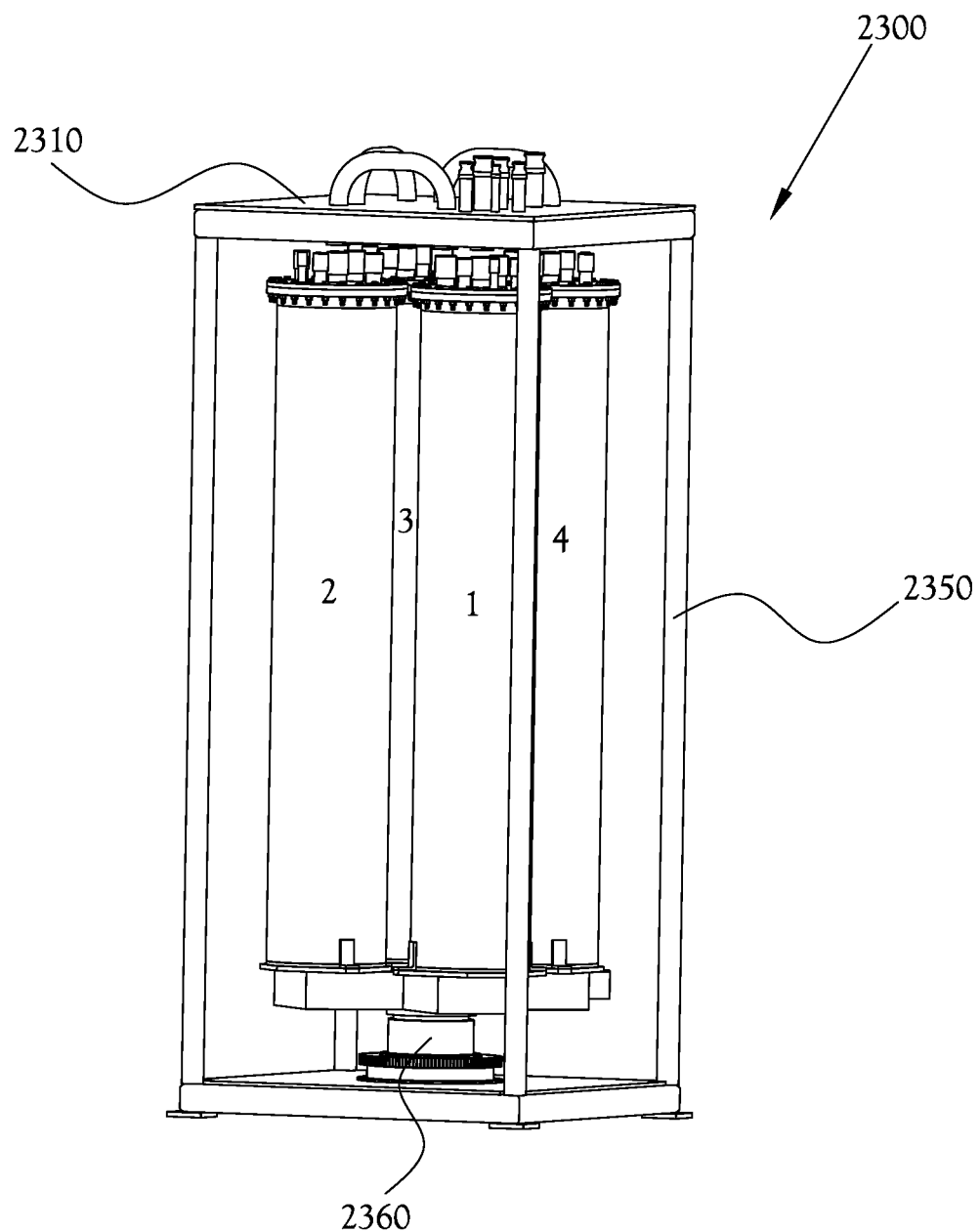
FIG. 23 represents a side view of the four-vessel decontamination system where lifting and rotation device is visible from a different angle.

FIG. 23 represents a side view of the four-vessel decontamination system 2200 where lifting and rotation device 2360 is visible from a different angle.

While not shown in the figures, if the primary water inlet maintains fluid communication with the first vessel, while the treated water outlet is moved to have fluid communication with the third vessel as opposed to the fourth vessel and the sluice water inlet, media inlet, and media outlet were moved to have fluid communication with the fourth vessel, continuous decontamination with one fewer than the total vessel number is possible. In this configuration contaminated water initially flows into the first vessel, through the second vessel, and out the third vessel, while the fourth vessel "rests". When the media in the first vessel is spent, the system rotates so the contaminated water flows into the second vessel, through the third vessel, and out the fourth vessel, which includes the initially unused fresh media. While decontamination of the contaminated water continues with the second, third, and fourth vessels, the media in the first vessel is being replaced as the initial first vessel is now the fourth vessel after the rotation. In this way, one less than the total vessel number are continuously being used for water decontamination, while the media in the additional vessel may be replaced.

The connections made between the rotary or fixed top manifold and the vessels are preferably of the quick disconnect connector type. If the decontamination system is operating submerged in the liquid to be contaminated, the connectors can leak when disconnected; similarly, if the decontamination system is operating on the surface, connectors that do not substantially leak when disconnected, thus being "dry break", dripless, or sanitary type connectors, are preferred. The connectors may use face O-Ring or radial O-Ring type seals, or other seal types that provide the desired connect/disconnect reproducibility to the system.

The functions of lifting (top rotary manifold or vessels) and rotation (top rotary manifold or vessels) may be provided electrically, pneumatically, hydraulically, or by a combination of two or more. For example, lifting, may be performed pneumatically or hydraulically, while rotation is electrically provided. In addition to rotating the top rotary manifold or the vessels, the rotator also accurately positions the rotated manifold or the vessels so that the connectors can align for reconnection. Such alignment function is preferably provided by a motor in combination with a Geneva wheel or drive, a precision servo-motor, or a less precise motor in combination with a locking pin to provide the alignment. The alignment function may be provided in additional ways. While electric motors are preferred, hydraulic motors also may be used to provide the rotation.

While various aspects of the invention are described, it will be apparent to those of ordinary skill in the art that other embodiments and implementations are possible within the scope of the invention. Accordingly, the invention is not to be restricted except in light of the attached claims and their equivalents.

What is claimed is:

1. A surface or submersible sluiceable lead-lag system to remove selected hazardous contaminants or radioactive isotopes from fluid waste materials, the system comprising:
    multiple waste fluid processing vessels to hold media, said media to remove selected hazardous contaminants or radioactive isotopes from fluid waste materials when the fluid waste materials are passed through said multiple waste fluid processing vessels, said multiple waste fluid processing vessels each comprising:
    a vessel body having an interior volume,
    a fill head having a plurality of ports giving access to the interior volume of said vessel body, including a fluid waste material input port, a treated fluid waste material output port, a sluice-in port to facilitate delivery of media to the interior volume of said vessel body, a sluice-out port to facilitate removal of spent media from the interior volume of said vessel body, and a sluice water input port,
    internal media containment screens within the vessel body,
    an internal waste fluid line to deliver fluid waste materials from said fluid waste material input port to a location within the interior volume of the vessel body, said location being placed such that fluid waste materials exiting the internal waste fluid line pass through said media before exiting the interior volume of the vessel body through said treated fluid waste material output port,
    a sluice-in tube to deliver media into the vessel during filling, and
    a sluice-out tube to remove media from the vessel, said sluice-out tube including a field effect eductor in fluid communication with the sluice water input port to fluidize and pump media out of the interior volume of said vessel body in response to sluice water entering the sluice water input port; and
    a rotating assembly selected from the group consisting of a rotating assembly above the fill heads of the multiple waste fluid processing vessels, and a rotating assembly beneath the multiple vessels, where the fill heads include quick disconnect fittings.

2. The system of claim 1, where the rotating assembly includes a Geneva wheel.

3. The system of claim 1, where the multiple waste fluid processing vessels are four waste fluid processing vessels.

4. The system of claim 1, where the quick disconnect fittings are pneumatically or physically operated.

5. The system of claim 1, where the fill head further comprises an exit tube near the fill head to convey away from the vessel treated fluid waste materials exiting the interior volume of the vessel body through said treated fluid waste material output port.

6. The system of claim 1, where the fill head further comprises a vent opening to prevent air or pressure build up within the vessels.

7. The system of claim 1, where the fill heads further comprises a secondary motive force eductor pump installed proximate the sluice-out ports on said fill heads.

8. A surface or submersible sluiceable lead-lag system to remove selected hazardous contaminants or radioactive isotopes from fluid waste materials, the system comprising:
   at least two waste fluid processing vessels to hold media, said at least two waste fluid processing vessels each comprising:
      a vessel body having an interior volume comprising media containment screens, and
      a fill head having a plurality of fill head ports providing access to the interior volume of the vessel body, the plurality of fill head ports including a fluid waste material input port, a treated fluid waste material output port, a media inlet port, a media outlet port, and a sluice water inlet port configured to drive a primary field effect eductor pump;
   a top manifold comprising a primary water inlet, a treated water outlet, a media inlet, a media outlet, a sluice water inlet, and at least one transfer tube;
   where the primary water inlet is in fluid communication with the fluid waste material input port, the treated fluid waste material output port is in fluid communication with the treated water outlet, the media inlet port is in fluid communication with the media inlet, the media outlet port is in fluid communication with the media outlet, and the sluice water inlet port is in fluid communication with the sluice water inlet; and
   a rotating assembly selected from the group consisting of a rotating assembly positioned above the at least two vessels, and a rotating assembly positioned below the at least two vessels.

9. The system of claim 8, further comprising quick disconnect fittings configured to establish at least one of the fluid communications.

10. The system of claim 9, the quick disconnect fittings configured to reduce fluid leakage when disconnected.

11. The system of claim 9, where the quick disconnect fittings are pneumatically or hydraulically operated.

12. The system of claim 8, where the at least one transfer tube establishes fluid communication between the at least two vessels.

13. The system of claim 12, where the at least one transfer tube establishes fluid communication between the treated fluid waste material output port of a first vessel and the fluid waste material input port of a second vessel.

14. The system of claim 8, the rotating assembly selected from the group consisting of a Geneva drive, a precision servo-motor, and a less precise motor than a precision servo-motor combined with a locking pin.

15. The system of claim 8, where the at least two waste fluid processing vessels are at least four waste fluid processing vessels.

16. The system of claim 8, where the fill heads of the at least two waste fluid processing vessels further comprise a vent port and the top manifold further comprises a gas vent in fluid communication with the vent port to prevent gas pressure build up within the vessels.

17. The system of claim 8, where the top manifold further comprises a secondary motive force eductor pump in fluid communication with the media outlet.

18. The system of claim 8, where the rotating assembly is configured to turn in a manner selected from the group consisting of clockwise, counterclockwise, and combinations thereof.

19. The system of claim 8, where the rotating assembly positioned above the at least two vessels is configured to raise, rotate, and lower the top manifold.

20. The system of claim 8, where the rotating assembly positioned below the at least two vessels is configured to lower, rotate, and raise the at least two vessels.

21. A surface or submersible sluiceable system to remove selected hazardous contaminants or radioactive isotopes from fluid waste materials, the system comprising:
   a waste fluid processing vessel to hold media, the media capable of removing selected hazardous contaminants or radioactive isotopes from fluid waste materials when the fluid waste materials are passed through said waste fluid processing vessel, said waste fluid processing vessel comprising:
      a vessel body having an interior volume;
      a fill head forming an enclosed interior volume with the vessel body, the fill head having a plurality of ports providing fluid access to the enclosed interior volume, where the plurality of ports comprise:
         a fluid waste material input port,
         a treated fluid waste material output port,
         a sluice-in port in fluid communication with a sluice-in tube, the sluice-in port configured to deliver sluice water to the enclosed interior volume by the sluice-in tube,
         a sluice-out port in fluid communication with a sluice-out tube, the sluice-out port configured to permit removal of spent media from the enclosed interior volume of said vessel body, and
         a sluice water input port;
      internal media containment screens within the vessel body;
      an internal waste fluid line to deliver fluid waste materials from the fluid waste material input port to a location within the enclosed interior volume of the vessel body, the location being placed such that fluid waste materials exiting the internal waste fluid line pass through said media before exiting the enclosed interior volume through the treated fluid waste material output port; and
      a primary field effect eductor within the enclosed interior volume, the primary field effect eductor configured to fluidize and pump the spent media out of the enclosed interior volume through the sluice-out port when driven by fluid entering the sluice water input port.

22. The system of claim 21, further comprising a vent opening in the fill head configured to prevent air or pressure build up within the enclosed interior volume.

23. The system of claim 21, further comprising a secondary motive force eductor pump installed proximate the sluice-out port.

24. The system of claim 21 further comprising at least one radiation monitor to monitor radiation levels within the enclosed interior volume or within the treated fluid waste materials exiting the enclosed interior volume through the treated fluid waste material output port.

* * * * *